(12) United States Patent
Hotta et al.

(10) Patent No.: US 10,788,397 B2
(45) Date of Patent: *Sep. 29, 2020

(54) ENGINE MISFIRE DETERMINATION DEVICE AND VEHICLE

(71) Applicants: DENSO CORPORATION, Kariya-shi, Aichi (JP); YAMAHA HATSUDOKI KABUSHIKI KAISHA, Iwata-shi, Shizuoka (JP)

(72) Inventors: Minoru Hotta, Kariya (JP); Yoshihiko Nonogaki, Kariya (JP); Hisatoshi Kinoshita, Iwata (JP); Yo Aramaki, Iwata (JP); Kazuteru Iwamoto, Iwata (JP)

(73) Assignees: DENSO CORPORATION, Kariya-shi, Aichi (JP); YAMAHA HATSUDOKI KABUSHIKI KAISHA, Iwata-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/179,852

(22) Filed: Nov. 2, 2018

(65) Prior Publication Data

US 2019/0128779 A1 May 2, 2019

(30) Foreign Application Priority Data

Nov. 2, 2017 (JP) .................................. 2017-212401

(51) Int. Cl.
*G01M 15/11* (2006.01)
*F02D 41/14* (2006.01)
*F02D 41/00* (2006.01)

(52) U.S. Cl.
CPC ......... *G01M 15/11* (2013.01); *F02D 41/0097* (2013.01); *F02D 41/1498* (2013.01); *F02D 2200/101* (2013.01); *F02D 2200/1015* (2013.01)

(58) Field of Classification Search
CPC ............ F02D 41/1497; F02D 41/1498; F02D 41/0097; F02D 2041/1432;
(Continued)

(56) References Cited

U.S. PATENT DOCUMENTS 6,298,717 B1   10/2001   Nishimura
7,536,902 B2 *  5/2009   Tsukamoto ............ G01M 15/11
                                                    73/114.04
(Continued)

FOREIGN PATENT DOCUMENTS

DE   19610580 A1   9/1997
JP   H4-365958 A   12/1992
(Continued)

*Primary Examiner* — Freddie Kirkland, III
(74) *Attorney, Agent, or Firm* — Rabin & Berdo, P.C.

(57) ABSTRACT

A misfire determination device includes: a combustion fluctuation canceled value acquisition unit that acquires a first combustion fluctuation canceled value corresponding to a first angle position and a second combustion fluctuation canceled value corresponding to a second angle position; a combustion fluctuation manifested value calculation unit that calculates a first fluctuation manifested value by removing the first combustion fluctuation canceled value from a rotation speed at the first angle position, and calculates a second fluctuation manifested value by removing the second combustion fluctuation canceled value from a rotation speed at the second angle position; a first-order difference calculation unit that calculates a first-order difference between the first fluctuation manifested value and the second fluctuation manifested value; and a specific cylinder misfire determination unit that determines a misfire in a specific cylinder by using the first-order difference.

7 Claims, 9 Drawing Sheets

(58) Field of Classification Search
CPC ....... F02D 2200/101; F02D 2200/1015; F02D 2250/14; F02D 2200/1002; F02P 17/12; F02P 2017/128; G01M 15/11
See application file for complete search history.

(56) References Cited

U.S. PATENT DOCUMENTS

| | | | |
|---|---|---|---|
| 8,909,403 B2* | 12/2014 | Yokouchi | B60K 6/445 701/22 |
| 9,857,273 B2* | 1/2018 | Hozumi | G01M 15/11 |
| 10,378,468 B2* | 8/2019 | Minatoya | F02D 41/1498 |
| 10,408,151 B2* | 9/2019 | Hotta | F02D 45/00 |
| 2007/0157713 A1* | 7/2007 | Tsukamoto | G01M 15/11 73/114.04 |
| 2012/0232774 A1 | 9/2012 | Minatoya et al. | |
| 2013/0190962 A1* | 7/2013 | Yokouchi | B60K 6/445 701/22 |
| 2018/0087462 A1* | 3/2018 | Hotta | F02D 41/1498 |

FOREIGN PATENT DOCUMENTS

| | | | |
|---|---|---|---|
| JP | H10-148153 A | 6/1998 | |
| WO | WO 2016-194953 A1 | 12/2016 | |

* cited by examiner

ENGINE MISFIRE DETERMINATION DEVICE AND VEHICLE

TECHNICAL FIELD

The present teaching relates to an engine misfire determination device, and to a vehicle including the misfire determination device.

BACKGROUND ART

Patent Literature 1 (PTL 1) shows a misfire detection device that detects a misfire occurring in an engine. The misfire detection device shown in PTL 1 detects a misfire by using an output of a rotation angle sensor that is configured to output a signal per each crank angle.

The misfire detection device as shown in PTL 1 is required to have less deterioration in detection accuracy.

The misfire detection device shown in PTL 1 obtains an average rotation speed $\omega_n$ in a combustion stroke of a first cylinder based on an output of the rotation angle sensor. Then, the misfire detection device obtains an average rotation speed $\omega_{n-1}$ for a cylinder whose combustion stroke is continuous from the combustion stroke of the aforementioned cylinder, and obtains a deviation $\omega_{n-1}-\omega_n$ between the two average rotation speeds. The misfire detection device also obtains an average rotation speed $\omega_{n-3}$ for a cylinder at a rotation angle 360 crank angle degrees before the combustion stroke of the first cylinder. Then, the misfire detection device obtains an average rotation speed $\omega_{n-4}$ for a cylinder whose combustion stroke is continuous therefrom, and obtains a deviation $\omega_{n-4}-\omega_{n-3}$ between the two average rotation speeds. Then, the misfire detection device obtains a difference between the two deviations, to set an average rotational frequency fluctuation amount $\Delta\omega_n$. The misfire detection device determines a misfire by comparing the average rotational frequency fluctuation amount $\Delta\omega_n$, which is a difference (second-order difference) obtained by two stages in the above-described manner, against a determination value. By the determination using the second-order difference, a deterioration in misfire detection accuracy due to an influence of acceleration and deceleration according to an accelerator operation, for example, can be suppressed.

CITATION LIST

Patent Literature

PTL 1: Japanese Patent Application Laid-Open No. H4-365958 (1992)

SUMMARY OF INVENTION

Technical Problem

Studies on a process of the misfire detection device as described in PTL 1 under various conditions revealed that a determination for detecting a misfire is sometimes difficult depending on types of engines.

An object of the present teaching is to provide an engine misfire determination device and a vehicle that are applicable to a misfire determination in various types of engines.

Solution to Problem

As a result of the present inventors' attempt to apply a misfire determination by the misfire detection device disclosed in PTL 1 to various types of engines, it was found that a misfire in an equal interval combustion engine can be detected with a high accuracy but a misfire determination accuracy in an unequal interval combustion engine is sometimes low.

The present inventors, therefore, conducted studies on a misfire determination in an unequal interval combustion engine.

In an unequal interval combustion engine, the interval of crank angles where combustion occurs varies from cylinder to cylinder. To determine a misfire in the unequal interval combustion engine, it is conceivable that a detection position (angle) for detecting an average rotation speed is adjusted in accordance with a crank angle where combustion occurs in each cylinder.

In the unequal interval combustion engine, however, there is a difference between, for example, a rotation speed for one cylinder and a rotation speed for another cylinder whose combustion stroke is continuous from a combustion stroke of the one cylinder. That is, a deviation between the two rotation speeds is not zero even in a normal state having no misfire. In addition, a magnitude relationship of the deviation between the two rotation speeds changes depending on detection positions. Thus, the value of a difference, i.e., a second-order difference, between a deviation obtained at a certain time point and a deviation obtained at a position 360 crank angle degrees before is not zero even in the normal state. Moreover, a plus/minus characteristic of the second-order difference value changes depending on detection positions. The second-order difference value varies in a wide range from a value smaller than zero to a value greater than zero as time elapses. This is why simply adjusting a detection position for detecting a rotation speed such that an unequal interval combustion engine can be dealt with by the method of PTL 1, for example, cannot provide a misfire detection with a high accuracy.

As shown in PTL 1, obtaining a second-order difference value between one deviation and another deviation at a position 360 crank angle degrees before contributes to reducing an influence of acceleration and deceleration according to, for example, an accelerator operation and a vehicle traveling situation in an equal interval combustion engine. As mentioned above, however, the second-order difference value in a position range of 360 crank angle degrees before and after changes as time elapses, even though there is no influence of acceleration and deceleration when the unequal interval combustion engine is in the normal state. It therefore is difficult to determine a misfire in the unequal interval combustion engine with a high accuracy by using the second-order difference.

The present inventors again conducted fundamental studies on a fluctuation in an engine rotation speed.

The engine rotation speed contains a fluctuation attributable to engine combustion and a fluctuation attributable to factors other than combustion.

The rotation speed fluctuation attributable to engine combustion includes an increase at a time of combustion and a decrease after combustion. Due to the increase and decrease, peaks of the rotation speed arise. For example, in a case of a single-cylinder engine, a peak comes every 720 crank angle degrees, and thus the crank angle between successive peaks is substantially constant. For example, in a case of an engine including a plurality of cylinders in which combustion occurs at equal intervals, the combustion in each of the cylinders repeatedly occurs at equal intervals, and therefore the crank angle between peaks is substantially constant.

Examples of the fluctuation attributable to factors other than repeated combustion include a fluctuation according to a fluctuation in intake air amount which is caused by a driver's operating an accelerator as described above. The fluctuation in the rotation speed attributable to factors other than combustion also includes a fluctuation attributable to a load applied from a wheel and a chain to the engine, for example.

To determine a misfire with a high accuracy, it is conceivable to perform the determination by using a fluctuation from which the fluctuation attributable to factors other than combustion has been excluded.

In a case where the engine is an unequal interval combustion engine, however, the interval between a crank angle where one cylinder causes combustion and a crank angle where another cylinder next to the one cylinder causes combustion varies depending on cylinders. A rotation speed at a time of combustion in one cylinder is influenced by energy generated by combustion in another cylinder previous to the combustion in the one cylinder, the energy decreasing over time. The rotation speed at a time of combustion, therefore, varies from cylinder to cylinder, for example. It is difficult to exclude a fluctuation attributable to factors other than combustion from the rotation speed which fluctuates with both the crank angle between peaks and the peak value varying from cylinder to cylinder, for determining a misfire with a high accuracy. It is also difficult to remove a peak value fluctuation attributable to unequal interval combustion from the rotation speed containing the fluctuation attributable to factors other than repeated combustion.

The present inventors conducted studies about acquiring, for each crank angle position, a rotation speed in a section of 720×m crank angle degrees including this crank angle position. Here, m is a natural number. Not only a fluctuation attributable to unequal interval combustion but also a fluctuation attributable to combustion that is used for a misfire determination has been removed from the rotation speed in a section of 720×m crank angle degrees.

The present inventors discovered that removing the rotation speed in a section of 720×m crank angle degrees from a rotation speed obtained at each corresponding crank angle position enables a fluctuation component attributable to unequal interval combustion to be manifested with a high accuracy.

Specifically, a rotation speed in a section of 720×m crank angle degrees including a certain crank angle position (first angle position) is removed from a rotation speed obtained at this first angle position. In the same manner, a rotation speed in a section of 720×m crank angle degrees including a second angle position different from the first angle position is removed from a rotation speed obtained at the second angle position.

A rotation speed in a section of 720×m crank angle degrees contains a fluctuation attributable to acceleration and deceleration according to, for example, an accelerator operation and a vehicle traveling situation. Thus, removing a rotation speed in a section of 720×m crank angle degrees including each angle position from a rotation speed obtained at this position results in cancellation of a fluctuation attributable to acceleration and deceleration according to an accelerator operation and a vehicle traveling situation. Consequently, a fluctuation component attributable to unequal interval combustion is manifested.

Calculating a first-order difference between the rotation speed at the first angle position in which the fluctuation component attributable to unequal interval combustion is manifested and the rotation speed at the second angle position in which the fluctuation component attributable to unequal interval combustion is manifested contributes to suppression with a high accuracy of an influence of a fluctuation attributable to unequal interval combustion for each cylinder. Accordingly, the first-order difference enables a misfire in the unequal interval combustion engine to be determined with a high accuracy.

The present inventors further conducted studies on a misfire determination in an equal interval combustion engine. As a result, it was found that a misfire determination with use of a first-order rotation speed difference obtained by removing a rotation speed in a section of 720×m crank angle degrees is applicable to an equal interval combustion engine, too.

The determination using the first-order difference value is more responsive to acceleration and deceleration according to an accelerator operation and a vehicle traveling situation than a determination using a value (of a second-order difference, for example) that is based on a rotation speed in a wide range. Thus, an erroneous determination is less likely to occur even when acceleration and deceleration according to an accelerator operation and a vehicle traveling situation are suddenly performed. A misfire can therefore be determined with a high accuracy. Moreover, the determination using the first-order difference value enables continuous misfires in a specific cylinder to be determined with a high accuracy, too.

The present teaching was made based on the above findings. An engine misfire determination device according to the present teaching is applicable to a misfire determination in various types of engines.

An engine misfire determination device according to each aspect of the present teaching accomplished based on the above findings has the following configurations.

(1) In an aspect of the present teaching, an engine misfire determination device that determines a misfire in an engine including a plurality of cylinders and a crankshaft based on a crank angle signal indicating a rotation angle of the crankshaft includes:

a combustion fluctuation canceled value acquisition unit that acquires a first combustion fluctuation canceled value and a second combustion fluctuation canceled value for every 720 crank angle degrees based on the crank angle signal while the engine is in operation, the first combustion fluctuation canceled value being a value in which a fluctuation component attributable to combustion is canceled, the first combustion fluctuation canceled value being a rotation speed in a section of 720×m crank angle degrees including a predetermined first angle position, the second combustion fluctuation canceled value being a value in which the fluctuation component attributable to combustion is canceled, the second combustion fluctuation canceled value being a rotation speed in a section of 720×m crank angle degrees including a second angle position that is separated from the first angle position by less than one cycle, where m is a natural number;

a combustion fluctuation manifested value calculation unit that calculates a first fluctuation manifested value and a second fluctuation manifested value based on the crank angle signal while the engine is in operation, the first fluctuation manifested value being a value in which the fluctuation component is manifested, the first fluctuation manifested value being calculated by removing, from a rotation speed at the first angle position, the first combustion fluctuation canceled value acquired by the combustion fluctuation canceled value acquisition unit, the first combustion fluctuation canceled value being a rotation speed in a section of 720×m crank angle degrees including the first angle position, the second fluctuation manifested value being a value in which the fluctuation component is manifested, the second fluctuation manifested value being calculated by removing, from a rotation speed at the second angle position, the second combustion fluctuation canceled value acquired by the combustion fluctuation canceled value acquisition unit, the second combustion fluctuation canceled value being a rotation speed in a section of 720×m crank angle degrees including the second angle position;

a first-order difference calculation unit that calculates a first-order difference between the first fluctuation manifested value and the second fluctuation manifested value calculated by the combustion fluctuation manifested value calculation unit while the engine is in operation, the calculation of the first fluctuation manifested value being performed by removing a rotation speed in a section of 720×m crank angle degrees including the first angle position from a rotation speed at the first angle position, the calculation of the second fluctuation manifested value being performed by removing a rotation speed in a section of 720×m crank angle degrees including the second angle position from a rotation speed at the second angle position; and a specific cylinder misfire determination unit that determines a misfire in a specific cylinder among the plurality of cylinders included in the engine by using the first-order difference between the first fluctuation manifested value and the second fluctuation manifested value, without calculating a second-order difference based on the first-order difference.

In the engine misfire determination device according to (1), the combustion fluctuation canceled value acquisition unit acquires the first combustion fluctuation canceled value and the second combustion fluctuation canceled value for every 720 crank angle degrees based on the crank angle signal. The first combustion fluctuation canceled value is a rotation speed in a section of 720×m crank angle degrees including the first angle position. The first combustion fluctuation canceled value is a value in which a fluctuation component attributable to combustion is canceled. The first combustion fluctuation canceled value is a value in which a fluctuation component attributable to unequal interval combustion is canceled in a case where the engine is an unequal interval combustion engine. The second combustion fluctuation canceled value is a rotation speed in a section of 720×m crank angle degrees including the second angle position. The second angle position is a position separated from the first angle position by less than one cycle. The second combustion fluctuation canceled value is a value in which a fluctuation component attributable to combustion is canceled. The second combustion fluctuation canceled value is a value in which a fluctuation component attributable to unequal interval combustion is canceled in a case where the engine is an unequal interval combustion engine.

The combustion fluctuation manifested value calculation unit calculates the first fluctuation manifested value in which a fluctuation component is manifested, by removing the first combustion fluctuation canceled value from the rotation speed at the first angle position. The combustion fluctuation manifested value calculation unit calculates the second fluctuation manifested value in which a fluctuation component is manifested, by removing the second combustion fluctuation canceled value from the rotation speed at the second angle position.

The first-order difference calculation unit calculates the first-order difference between the first fluctuation manifested value and the second fluctuation manifested value obtained by the calculation.

The specific cylinder misfire determination unit uses the first-order difference to determine a misfire in a specific cylinder among the plurality of cylinders included in the engine. The specific cylinder misfire determination unit determines a misfire by using the first-order difference, without calculating a second-order difference based on the first-order difference.

The first fluctuation manifested value is calculated by removing the first combustion fluctuation canceled value from the rotation speed at the first angle position. In a case where the engine is, for example, an unequal interval combustion engine, the first combustion fluctuation canceled value is a value in which a fluctuation component attributable to unequal interval combustion is canceled.

More specifically, the combustion fluctuation canceled value acquisition unit acquires, as the first combustion fluctuation canceled value, a rotation speed in a section of 720×m crank angle degrees including the first angle position. The first combustion fluctuation canceled value contains a fluctuation attributable to acceleration and deceleration according to, for example, an accelerator operation and a vehicle traveling situation. Thus, removing the first combustion fluctuation canceled value from the rotation speed at the first angle position results in removal of the fluctuation attributable to acceleration and deceleration. The acquisition and calculation performed for the first angle position are similarly performed for the second angle position, too. The engine misfire determination device according to (1) enables a rotation speed fluctuation caused by the acceleration and deceleration to be removed with a high accuracy, even in an unequal interval combustion engine in which a peak value of the rotation speed and an angle between peaks of the rotation speed within a cycle vary from cylinder to cylinder. Accordingly, the fluctuation component attributable to unequal interval combustion can be manifested with a high accuracy. In addition, the engine misfire determination device according to (1) enables a rotation speed fluctuation caused by the acceleration and deceleration to be removed with a high accuracy in a case where the engine is an equal interval combustion engine as well as in a case where the engine is an unequal interval combustion engine.

Even in a case where the engine is an unequal interval combustion engine, the fluctuation component attributable to unequal interval combustion is manifested with a high accuracy, and therefore a misfire in a specific cylinder can be determined with a high accuracy by using the first-order difference between the first fluctuation manifested value and the second fluctuation manifested value. In a case where the engine is an equal interval combustion engine, too, a misfire in a specific cylinder can be determined with a high accuracy by using the first-order difference between the first fluctuation manifested value and the second fluctuation manifested value.

Since a misfire is determined using a value of the first-order difference between the rotation speed for the first angle position in which the fluctuation component attributable to unequal interval combustion is manifested and the rotation speed for the second angle position in which the fluctuation component attributable to unequal interval combustion is manifested, a misfire in an unequal interval combustion engine can be determined with a high accuracy.

Determining a misfire by using a value of the first-order difference between rotation speeds each obtained by removing a rotation speed in a section of 720×m crank angle degrees is also applicable to an equal interval combustion engine. The combustion fluctuation canceled value acquisition unit acquires, as the first combustion fluctuation canceled value, a rotation speed in a section of 720×m crank angle degrees including the first angle position. By the combustion fluctuation manifested value calculation unit, the first combustion fluctuation canceled value is removed from the rotation speed at the first angle position, for removal of the fluctuation attributable to acceleration and deceleration. In addition, the second combustion fluctuation canceled value is removed from the rotation speed at the second angle position. Determining a misfire by using a value of the first-order difference between the rotation speed for the first angle position from which the fluctuation attributable to acceleration and deceleration is removed and the rotation speed for the second angle position from which the fluctuation attributable to acceleration and deceleration is removed enables a misfire to be determined with a high accuracy in an equal interval combustion engine, too.

The determination using a value of the first-order difference, which is performed by the engine misfire determination device according to (1), is more responsive to acceleration and deceleration according to an accelerator operation and a vehicle traveling situation than a determination using a value that is based on a rotation speed in a wider range, such as a value of a second-order difference. Thus, an erroneous determination is less likely to occur even when acceleration and deceleration according to an accelerator operation and a vehicle traveling situation are suddenly performed. A misfire can therefore be determined with a high accuracy.

Accordingly, the engine misfire determination device according to (1) can determine a misfire in various types of engines including an unequal interval combustion engine and an equal interval combustion engine.

(2) Another aspect of the present teaching is the engine misfire determination device according to (1), in which the combustion fluctuation canceled value acquisition unit acquires, as the first combustion fluctuation canceled value, a rotation speed in a section of 720×m crank angle degrees centered at the first angle position, and acquires, as the second combustion fluctuation canceled value, a rotation speed in a section of 720×m crank angle degrees centered at the second angle position, and the combustion fluctuation manifested value calculation unit calculates the first fluctuation manifested value in which the fluctuation component is manifested by removing a rotation speed value in a section of 720×m crank angle degrees centered at the first angle position from a rotation speed at the first angle position, the rotation speed value serving as the first combustion fluctuation canceled value acquired by the combustion fluctuation canceled value acquisition unit, and calculates the second fluctuation manifested value in which the fluctuation component is manifested by removing a rotation speed value in a section of 720×m crank angle degrees centered at the second angle position from a rotation speed at the second angle position, the rotation speed value serving as the second combustion fluctuation canceled value acquired by the combustion fluctuation canceled value acquisition unit.

In the combustion engine misfire determination device according to (2), the rotation speed acquired as the first combustion fluctuation canceled value is a rotation speed in a section of 720×m crank angle degrees centered at the first angle position. In other words, the first angle position is at the center of the section of 720×m crank angle degrees for which the first combustion fluctuation canceled value is acquired. Thus, a combustion state at the first angle position is reflected in the first combustion fluctuation canceled value and in the first fluctuation manifested value with a higher accuracy. A combustion state at the second angle position is reflected in the second combustion fluctuation canceled value and in the second fluctuation manifested value with a higher accuracy.

Accordingly, the combustion engine misfire determination device according to (2) can determine a misfire in a specific cylinder of various types of engines including an equal interval combustion engine with a higher accuracy.

(3) Another aspect of the present teaching is the engine misfire determination device according to (1) or (2), further including a storage unit that stores a value, in which the first-order difference calculation unit calculates the first-order difference for every 720 crank angle degrees, and the specific cylinder misfire determination unit stores the first-order difference calculated by the first-order difference calculation unit in the storage unit, and determines a misfire in a specific cylinder among the plurality of cylinders included in the engine by using the first-order difference calculated by the first-order difference calculation unit and the value stored in the storage unit at a time of a previous determination.

The engine misfire determination device according to (3) can determine continuous misfires in a specific cylinder with a higher accuracy.

(4) A vehicle according to another aspect of the present teaching includes:

the engine misfire determination device according to any one of (1) to (3); and an engine for which a misfire is determined by the engine misfire determination device.

The configuration of (4) can determine a misfire in an engine with a high accuracy, both in a case of an engine type being an unequal interval combustion engine and in a case of an engine type being an equal interval combustion engine.

The terminology used herein is for defining particular embodiments only and is not intended to be limiting the teaching.

As used herein, the term "and/or" includes any and all combinations of one or more of the associated listed items.

As used herein, the terms "including", "comprising", or "having", and variations thereof specify the presence of stated features, steps, operations, elements, components, and/or equivalents thereof, and can include one or more of steps, operations, elements, components, and/or their groups.

As used herein, the terms "attached", "connected", "coupled", and/or equivalents thereof are used in a broad sense, and include both of direct and indirect attachment, connection, and coupling.

Unless otherwise defined, all terms (including technical and scientific terms) used herein have the same meaning as commonly understood by one of ordinary skill in the art to which the present teaching belongs.

It will be further understood that terms, such as those defined in commonly used dictionaries, should be interpreted as having a meaning that is consistent with their meaning in the context of the present disclosure and relevant art and should not be interpreted in an idealized or overly formal sense unless expressly so defined herein.

It will be understood that the description of the present teaching discloses a number of techniques and steps.

Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion.

Nevertheless, Description and Claims should be read with the understanding that such combinations are entirely within the scope of the present teaching and the claims.

This Description describes a novel engine misfire determination device.

In the description given below, for the purposes of explanation, numerous specific details are set forth in order to provide a thorough understanding of the present teaching.

It will be apparent, however, that those skilled in the art may practice the present teaching without these specific details.

The present disclosure is to be considered as an exemplification of the present teaching, and is not intended to limit the present teaching to the specific embodiments illustrated by drawings or descriptions below.

The misfire as used herein means a phenomenon where combustion of a mixed gas in an engine is not normal. Normal combustion is caused when mixed gas supply, compression, and ignition spark are normally performed in a gasoline engine. Any abnormality in one or more of the mixed gas supply, compression, and ignition spark leads to a failure of normal combustion. More specifically, the misfire as used herein means a phenomenon where normal combustion of a mixed gas is not caused because of an abnormality in one or more of the mixed gas supply, compression, and ignition spark.

The engine misfire determination device according to the present teaching can be used for determination of continuous misfires. The engine misfire determination device according to the present teaching can be used for determination of a misfire other than continuous misfires. The engine misfire determination device according to the present teaching may be used for, for example, determination of a single misfire occurring in successive combustions.

Cancellation of a fluctuation component attributable to combustion includes both zeroing the fluctuation component attributable to combustion and reducing the fluctuation component attributable to combustion as compared to an instantaneous rotation speed based on a crank angle signal.

The engine misfire determination device according to the present teaching determines a misfire based on a rotation speed. How to express the rotation speed in the device is not particularly limited. For example, the rotation speed may be expressed as a time required for the crankshaft to rotate through a predefined angle, or may be expressed as a rotational frequency or angle per unit time which is computed as a reciprocal for the time.

In the present teaching, the natural number m which determines a range corresponding to the combustion fluctuation canceled value is one, for example. The value of m, however, is not limited to this, and it may be two or three, for example.

The engine misfire determination device according to the present teaching is applicable to an unequal interval combustion engine. The engine misfire determination device according to the present teaching is also applicable to an equal interval combustion engine.

The unequal interval combustion engine is an engine in which each of the plurality of cylinders causes combustion at unequal intervals on the basis of a crank angle. The unequal interval combustion engine is, for example, a gasoline engine fueled by gasoline. The engine including a plurality of cylinders may be, for example, a two-cylinder engine, a three-cylinder engine, or an engine with four or more cylinders. The engine including a plurality of cylinders may be, for example, a parallel type engine or a V-type engine.

The first-order difference is a value of a difference between a value corresponding to one crank angle position and a value corresponding to another crank angle position. The second-order difference is a value of a difference between two first-order differences.

The vehicle includes, for example, wheels in addition to the engine. The wheels include a drive wheel that is rotated by receiving power outputted from the engine. The number of wheels is not particularly limited. No particular limitation is put on the vehicle, and examples thereof include a four-wheel automobile and a straddled vehicle. In an instance, the four-wheel automobile has a cabin. The straddled vehicle means a type of vehicle in which a driver strides a saddle when seated. Examples of the straddled vehicle include motorcycles, motor tricycles, and ATVs (All-Terrain Vehicles).

Advantageous Effects of Invention

The present teaching can provide an engine misfire determination device applicable to a misfire determination in various types of engines, and a vehicle including the engine misfire determination device.

DESCRIPTION OF EMBODIMENTS

Some embodiments of the present teaching will now be described with reference to the drawings.

First Embodiment

Figure 1:
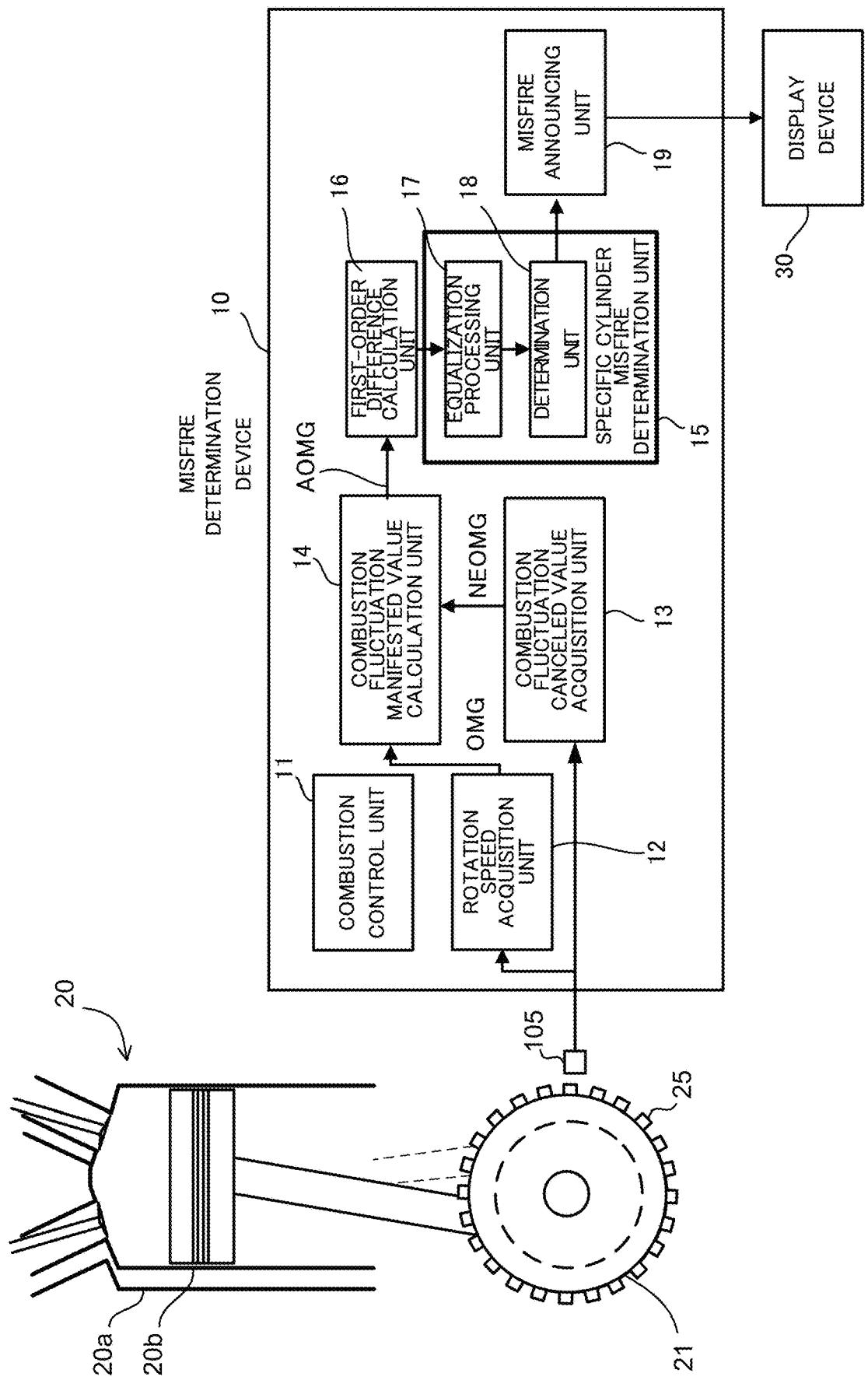
FIG. 1 is a diagram schematically showing a configuration of an engine misfire determination device and its peripheral devices according to a first embodiment of the present teaching.

FIG. 1 is a configuration diagram schematically showing configurations of an engine misfire determination device and its peripheral devices according to a first embodiment of the present teaching.

An engine misfire determination device 10 (which hereinafter may be simply referred to as misfire determination device 10) shown in FIG. 1 determines a misfire in an engine 20.

Figure 9:
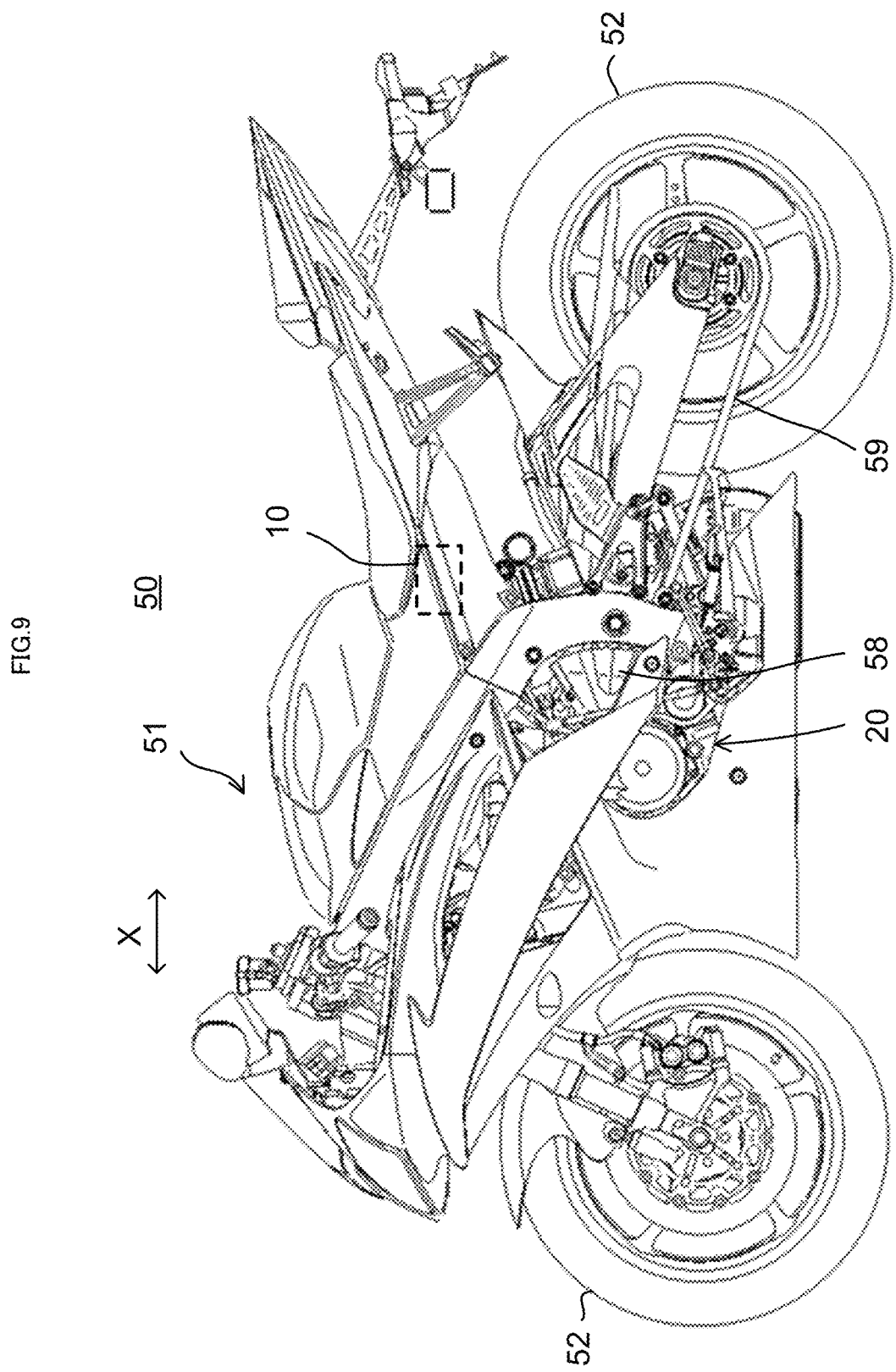
FIG. 9 is a diagram showing an external appearance of a straddled vehicle equipped with the misfire determination device according to the first embodiment or the second embodiment.

The engine 20 may be provided in, for example, a straddled vehicle 50 shown in FIG. 9. The engine 20 drives the straddled vehicle 50, and more exactly drives a wheel 52 of the straddled vehicle 50.

The engine 20 of this embodiment is a four-stroke engine. The engine 20 includes a plurality of cylinders 20a, 20b. FIG. 1 shows two cylinders, and an internal configuration of one of the two cylinders is illustrated.

The engine 20 of this embodiment is an unequal interval combustion engine, although embodiments of the present invention are not limited to an unequal interval combustion engine. In the engine 20, combustion in each of the cylinders 20a, 20b is performed at unequal intervals on the basis of the rotation angle of the crankshaft.

The engine 20 includes a crankshaft 21. The crankshaft 21 is rotated along with an operation of the engine 20. That is, the crankshaft 21 is rotated by the engine 20. The crankshaft 21 is provided with a plurality of detection object parts 25 for detection of rotation of the crankshaft 21. The detection object parts 25 are arranged in a circumferential direction of the crankshaft 21 and spaced from one another by predefined arrangement angles when viewed from the rotation center of the crankshaft 21. The detection object parts 25 move as the crankshaft 21 rotates.

The misfire determination device 10 detects a misfire in the engine 20 based on a rotation speed of the crankshaft 21.

The misfire determination device 10 of this embodiment also has a function as a control device that controls operations of the engine 20. The misfire determination device 10 is an electronic control unit (ECU). The misfire determination device 10 includes a combustion control unit 11. The combustion control unit 11 controls a combustion operation of the engine 20. Here, it may be acceptable that the misfire determination device 10 is separate from a control device that controls operations of the engine 20.

A rotation sensor 105 and a display device 30 are connected to the misfire determination device 10. The rotation sensor 105 is a sensor for acquiring a rotation speed of the crankshaft 21 of the engine 20. The rotation sensor 105 detects rotation of the crankshaft 21. The rotation sensor 105 outputs a signal upon detecting passage of the detection object part 25. The rotation sensor 105 outputs a signal each time the crankshaft 21 of the engine 20 is rotated through the arrangement angle.

The display device 30 is also connected to the misfire determination device 10. The display device 30 displays information outputted from the misfire determination device 10.

An intake pressure sensor, a fuel injection device, and a spark plug, all of which are not shown, are also connected to the misfire determination device 10.

The misfire determination device 10 includes a combustion fluctuation canceled value acquisition unit 13, a combustion fluctuation manifested value calculation unit 14, a first-order difference calculation unit 16, and a specific cylinder misfire determination unit 15. The misfire determination device 10 also includes a rotation speed acquisition unit 12.

Figure 2:
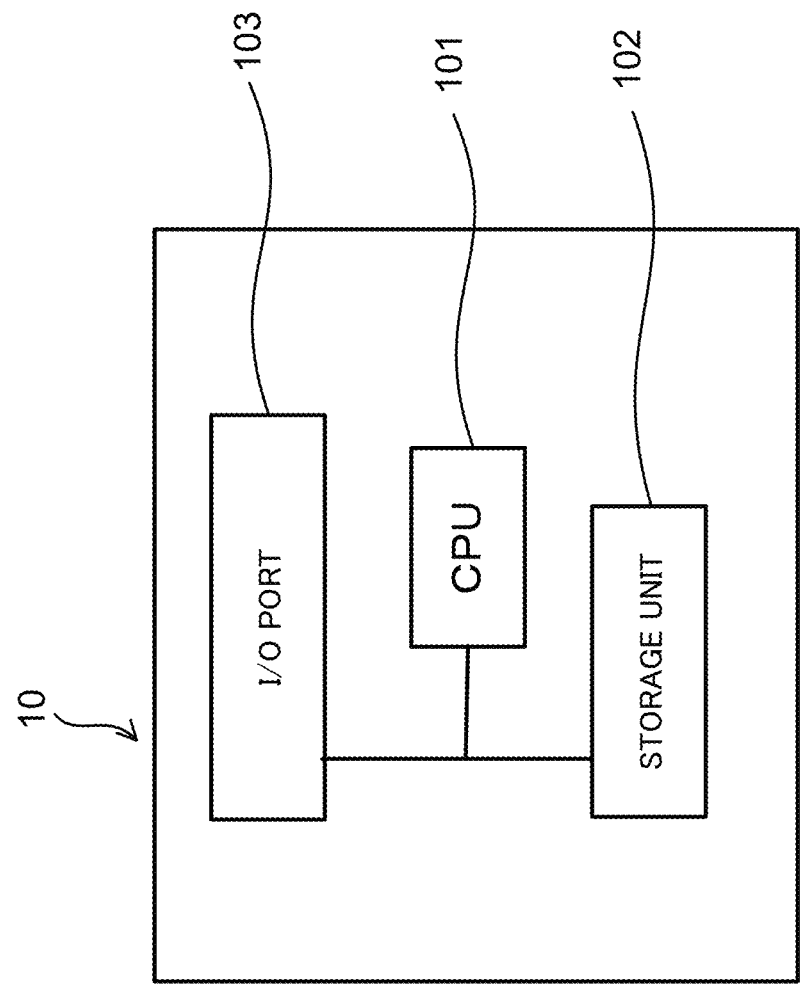
FIG. 2 is a block diagram showing a hardware configuration of the misfire determination device shown in FIG. 1.

FIG. 2 is a block diagram showing a hardware configuration of the misfire determination device 10 shown in FIG. 1.

The misfire determination device 10 includes a CPU 101, a storage unit 102, and an I/O port 103.

The CPU 101 executes a computing process based on a control program. The storage unit 102 stores the control program and information necessary for computation. The I/O port 103 inputs and outputs signals to and from an external device.

The rotation sensor 105 and the display device 30 (see FIG. 1) are connected to the I/O port 103.

The CPU 101 which executes the control program controls the hardware shown in FIG. 2, thus implementing each of the rotation speed acquisition unit 12, the combustion fluctuation canceled value acquisition unit 13, the combustion fluctuation manifested value calculation unit 14, the specific cylinder misfire determination unit 15, a misfire announcing unit 19, and the combustion control unit 11, shown in FIG. 1.

The rotation speed acquisition unit 12 shown in FIG. 1 acquires a rotation speed (OMG) of the crankshaft 21 based on an output of the rotation sensor 105. The rotation speed of the crankshaft 21 is the rotation speed of the engine 20. The rotation speed acquisition unit 12 acquires a crank angle signal indicating the rotation angle of the crankshaft 21 from the rotation sensor 105. The rotation speed acquisition unit 12 acquires the rotation speed of the crankshaft 21 based on the signal supplied from the rotation sensor 105. The rotation speed acquisition unit 12 acquires a rotation speed at a specific angle position of the crankshaft 21. Specifically, the rotation speed acquisition unit 12 acquires rotation speeds at first and second angle positions that are set for each cylinder in 720 crank angle degrees.

The combustion fluctuation canceled value acquisition unit 13 acquires a combustion fluctuation canceled value (NEOMG) based on the crank angle signal while the engine 20 is in operation. The combustion fluctuation canceled value is a rotation speed value in which a fluctuation component attributable to combustion is canceled from the rotation speed of the crankshaft 21.

For example, the combustion fluctuation canceled value acquisition unit 13 acquires a first combustion fluctuation canceled value and a second combustion fluctuation canceled value in accordance with the first angle position and the second angle position, respectively. More specifically, the combustion fluctuation canceled value acquisition unit 13 acquires a rotation speed in a section of 720×m crank angle degrees including the first angle position, as the first combustion fluctuation canceled value. The combustion fluctuation canceled value acquisition unit 13 acquires a rotation speed in a section of 720×m crank angle degrees including the second angle position, as the second combustion fluctuation canceled value. Here, m is a natural number. This embodiment will be described mainly on the assumption that m is one. The combustion fluctuation canceled value acquisition unit 13 acquires a plurality of combustion fluctuation canceled values for every 720 crank angle degrees.

Figure 3:
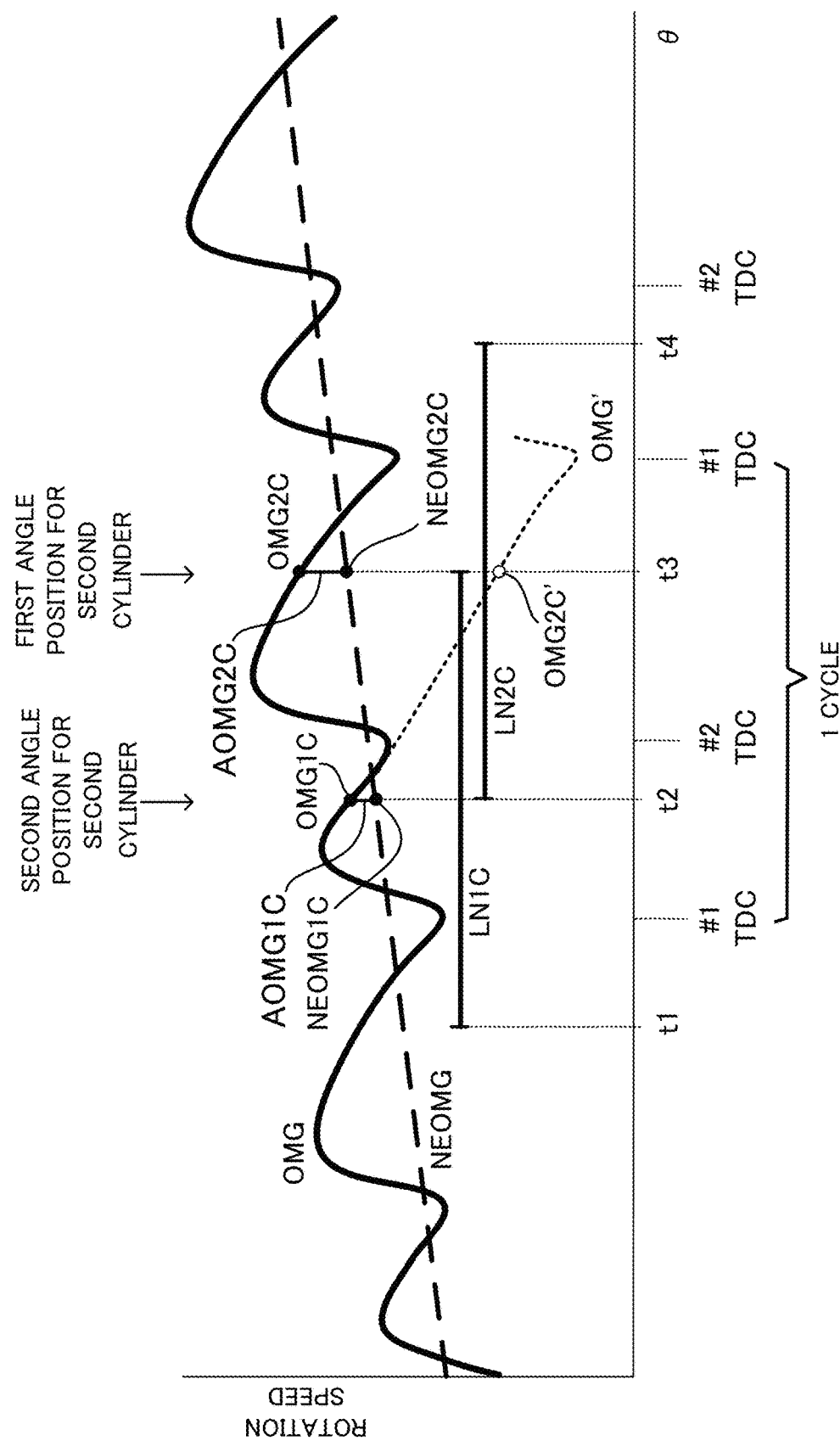
FIG. 3 is a graph schematically showing a rotation speed of a crankshaft rotated by an engine.

FIG. 3 is a graph schematically showing the rotation speed of the crankshaft 21 rotated by the engine 20.

In FIG. 3, the horizontal axis represents a rotation angle θ of the crankshaft 21, and the vertical axis represents the rotation speed.

In FIG. 3, the solid line indicates the rotation speed OMG in a case where no misfire occurs while the engine 20 is in operation. The rotation speed OMG is formed by connecting rotation speeds OMG into a curved line, each of the rotation speeds OMG being acquired upon passage of each detection object part 25. The rotation speed OMG of FIG. 3 is a rotation speed at every arrangement angle. That is, the rotation speed OMG of FIG. 3 represents an instantaneous rotation speed.

In an example shown in FIG. 3, the rotation speed OMG repeats an increase due to combustion in each cylinder 20a, 20b and a decrease after the combustion. In the engine 20 (see FIG. 1), each of the plurality of cylinders 20a, 20b causes one combustion within a period of one cycle. For example, the period of one cycle has combustion that starts at compression top dead center (#1TDC) of the first cylinder 20a and combustion that starts at compression top dead center (#2TDC) of the second cylinder 20b.

In Description herein, the compression top dead center (#1TDC) of the first cylinder 20a serves as a delimiter of one cycle.

In the engine 20, a rotation angle from the compression top dead center (#1TDC) of the first cylinder 20a to the subsequent compression top dead center (#2TDC) of the second cylinder 20b is different from a rotation angle from the compression top dead center (#2TDC) of the second cylinder 20b to the subsequent compression top dead center (#1TDC) of the first cylinder 20a. In the engine 20, in the same cycle, the height of a rotation speed peak caused by combustion in the first cylinder 20a is different from the height of a rotation speed peak caused by combustion in the second cylinder 20b.

In FIG. 3, the fine dotted line indicates a rotation speed OMG' in a case of a misfire occurring in the second cylinder 20b. In a case of a misfire occurring in a cylinder, an increment of the rotation speed corresponding to the cylinder where the misfire has occurred is smaller as compared to when no misfire occurs. Specifically, the rotation speed corresponding to the cylinder where the misfire has occurred decreases.

Basically, the specific cylinder misfire determination unit 15 determines a misfire based on a difference between the rotation speeds at the first and second angle positions that are set for each cylinder. The first angle position is set to an angle position where an influence of combustion in a corresponding cylinder is likely to be reflected in the rotation speed. The second angle position is set to a position separated from the first angle position by less than one cycle.

In the misfire determination device 10 of this embodiment, an angle position t2 is set as the first angle position corresponding to the first cylinder, and an angle position t1 is set as the second angle position corresponding to the first cylinder.

An angle position t3 is set as the first angle position corresponding to the second cylinder, and the angle position t2 is set as the second angle position.

The first angle position and the second angle position corresponding to each cylinder are fixed angle positions within one cycle. The first angle position and the second angle position corresponding to each cylinder comes once in each cycle of the engine 20.

For example, the specific cylinder misfire determination unit 15 of this embodiment determines a misfire in the second cylinder based on a difference between a rotation speed at the first angle position t3 and a rotation speed at the second angle position t2.

In the engine 20, as mentioned above, the height of a rotation speed peak caused by combustion in the first cylinder 20a and the height of a rotation speed peak caused by combustion in the second cylinder 20b are different from each other even when no misfire occurs.

Basically, the specific cylinder misfire determination unit 15 of this embodiment determines a misfire based on a difference (first-order difference) between a rotation speed at the first angle position corresponding to each cylinder and a rotation speed at the second angle position that is set independently of the first angle position. This can reduce a deterioration in determination accuracy which can otherwise be caused by a difference in the rotation speed among the plurality of cylinders.

A fluctuation in the rotation speed OMG shown in FIG. 3 contains a fluctuation that is different from a repetition of increase and decrease which is attributable to combustion and that is also different from a difference in peak heights which is attributable to unequal interval combustion. In FIG. 3, for example, a plurality of peaks caused by combustion in the first cylinder 20a are expressed. The height of a peak caused by combustion in the first cylinder 20a gradually rises. Such a fluctuation in the rotation speed is attributable to a fluctuation in intake air amount which is caused by a driver's operation for example, or to a fluctuation in load applied to the engine.

Thus, the fluctuation attributable to combustion contains a fluctuation as indicated by the broken line NEOMG. Under this state, in spite of an attempt to remove an influence of the peak height differences among cylinders from the determination, it is difficult to appropriately remove the influence. This lowers the accuracy of the misfire determination in the engine 20.

In the misfire determination device 10 of this embodiment, a rotation speed fluctuation attributable to unequal interval combustion is manifested by the combustion fluctuation canceled value acquisition unit 13 and the combustion fluctuation manifested value calculation unit 14 shown in FIG. 1.

A misfire determination for the second cylinder 20b will now be described as an example. The angle position t3 shown in FIG. 3 is set as the first angle position corresponding to the second cylinder 20b. At the first angle position t3 for the second cylinder 20b, an influence of combustion in the second cylinder 20b is likely to be reflected in the rotation speed. The angle position t2 is set as the second angle position corresponding to the second cylinder 20b. In the example shown in FIG. 3, the angle position t2 serves also as the first angle position corresponding to the first cylinder. The following description will be given with the angle position t2 seen as the second angle position corresponding to the second cylinder 20b.

The second angle position t2 is detected earlier than the first angle position t3 is. The rotation speed acquisition unit 12 acquires a rotation speed OMG1C at the second angle position t2 for the second cylinder 20b. The rotation speed acquisition unit 12 acquires a rotation speed OMG2C at the first angle position t3. The combustion fluctuation canceled value acquisition unit 13 acquires a second combustion fluctuation canceled value NEOMG1C at the second angle position t2. The second combustion fluctuation canceled value NEOMG1C is a rotation speed in a section of 720 crank angle degrees including the second angle position t2, as described above. The combustion fluctuation canceled value acquisition unit 13 acquires a first combustion fluctuation canceled value NEOMG2C at the first angle position t3. The first combustion fluctuation canceled value NEOMG2C is a rotation speed in a section of 720 crank angle degrees including the first angle position t3. An actual timing when each of the values is acquired is after passing a section range corresponding to the value, as will be described later.

After the second combustion fluctuation canceled value NEOMG1C is acquired at the second angle position t2, the combustion fluctuation manifested value calculation unit 14 removes the second combustion fluctuation canceled value NEOMG1C from the rotation speed OMG1C at the second angle position t2. By removing the second combustion fluctuation canceled value NEOMG1C from the rotation speed OMG1C at the second angle position, the combustion fluctuation manifested value calculation unit 14 calculates a second fluctuation manifested value AOMG1C in which a fluctuation component attributable to unequal interval combustion is manifested.

Then, the combustion fluctuation manifested value calculation unit 14 removes the first combustion fluctuation canceled value NEOMG2C from the rotation speed OMG2C at the first angle position t3. By removing the first combustion fluctuation canceled value NEOMG2C from the rotation speed OMG2C at the first angle position, the combustion fluctuation manifested value calculation unit 14 calculates a first fluctuation manifested value AOMG2C in which a fluctuation component attributable to unequal interval combustion is manifested.

The first-order difference calculation unit 16 calculates a difference between the first fluctuation manifested value AOMG2C and the second fluctuation manifested value AOMG1C. The difference calculated by the first-order difference calculation unit 16 is a first-order difference.

For example, the first-order difference calculation unit 16 calculates a first-order difference NDOMG2C between the first fluctuation manifested value AOMG2C (OMG2C−NEOMG2C) for the second cylinder 20*b* and the second fluctuation manifested value AOMG1C (OMG1C−NEOMG1C) for the second cylinder 20*b*.

The specific cylinder misfire determination unit 15 determines a misfire based on the first-order difference NDOMG2C calculated by the first-order difference calculation unit 16 while the engine 20 is in operation.

The specific cylinder misfire determination unit 15 includes an equalization processing unit 17 and a determination unit 18. Details of the equalization processing unit 17 and the determination unit 18 will be described later.

Figure 4:
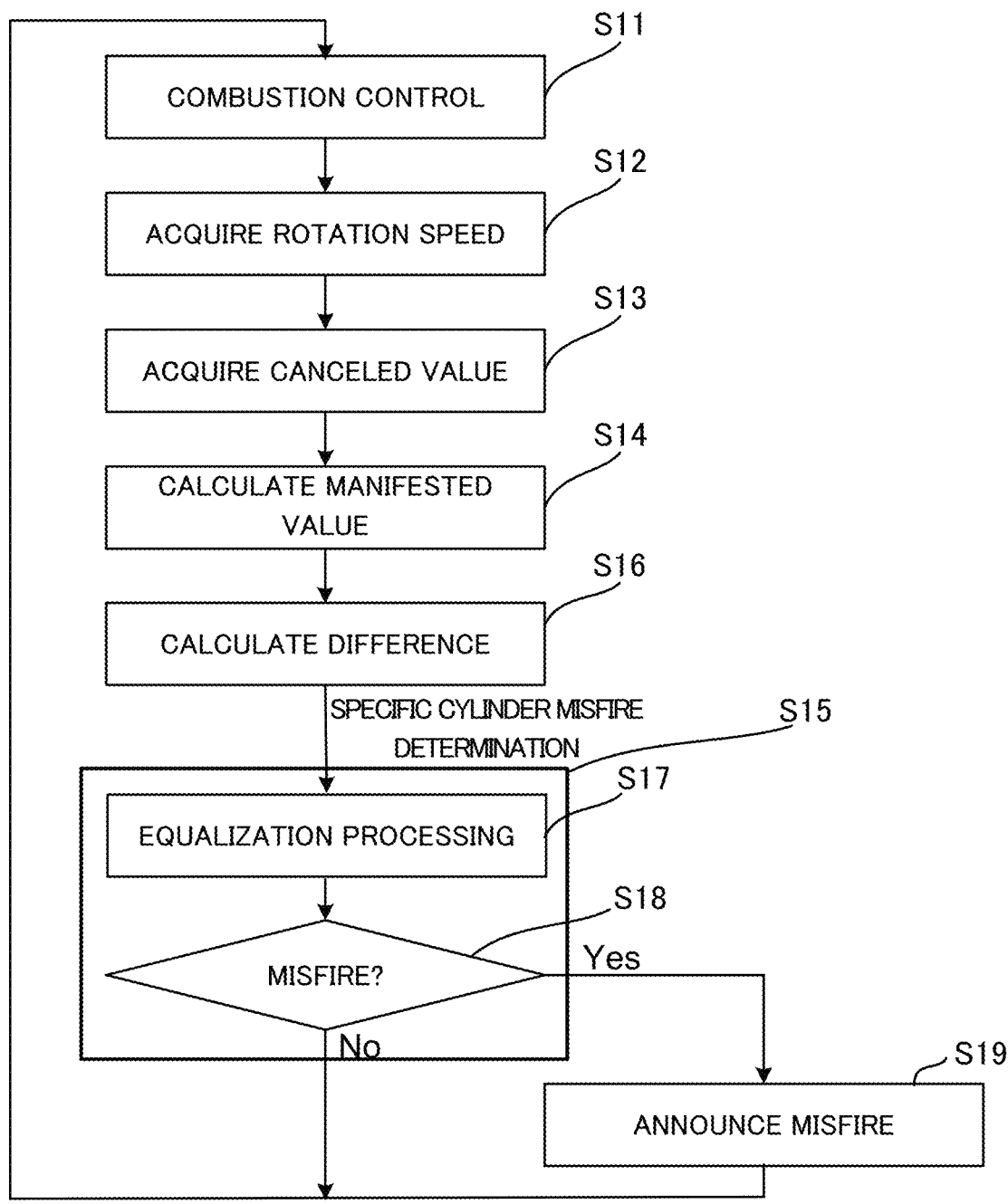
FIG. 4 is a flowchart of operations of the misfire determination device shown in FIG. 2.

FIG. 4 is a flowchart of operations of the misfire determination device 10 shown in FIG. 2.

The misfire determination device 10 repeatedly executes processing shown in FIG. 4.

In the misfire determination device 10, first, the combustion control unit 11 controls a combustion operation of the engine 20 (S11). Then, the rotation speed acquisition unit 12 acquires rotation speeds OMG2C, OMG1C of the crankshaft 21 at the first and second angle positions, respectively (S12). Then, the combustion fluctuation canceled value acquisition unit 13 acquires a first combustion fluctuation canceled value NEOMG2C and a second combustion fluctuation canceled value NEOMG1C corresponding to the first angle position and the second angle position, respectively (S13).

Then, the combustion fluctuation manifested value calculation unit 14 removes the first combustion fluctuation canceled value NEOMG2C acquired by the combustion fluctuation canceled value acquisition unit 13 from the rotation speed OMG2C at the first angle position, to calculate a first fluctuation manifested value AOMG2C. The combustion fluctuation manifested value calculation unit 14 also removes the second combustion fluctuation canceled value NEOMG1C acquired by the combustion fluctuation canceled value acquisition unit 13 from the rotation speed OMG1C at the second angle position, to calculate a second fluctuation manifested value AOMG1C (S14).

Then, the first-order difference calculation unit 16 calculates a first-order difference which is a difference between the first fluctuation manifested value AOMG2C and the second fluctuation manifested value AOMG1C (S16).

Then, the specific cylinder misfire determination unit 15 determines a misfire in a specific cylinder of the engine 20 (S15). More specifically, in step S15, the equalization processing unit 17 equalizes the first-order difference (S17). Then, the determination unit 18 determines the presence or absence of a misfire based on an equalized difference (S18).

Each of the rotation speed acquisition unit 12, the combustion fluctuation canceled value acquisition unit 13, the specific cylinder misfire determination unit 15, the first-order difference calculation unit 16, the equalization processing unit 17, and the determination unit 18 executes data processing when its processing object data becomes processable.

If the specific cylinder misfire determination unit 15 determines that a misfire has occurred in the specific cylinder (S18: Yes), the misfire announcing unit 19 announces the presence of a misfire (S19). If the specific cylinder misfire determination unit 15 does not determine the presence of a misfire (S18: No), the misfire announcing unit 19 does not perform announcement.

The order in which the combustion control unit 11, the rotation speed acquisition unit 12, the combustion fluctuation canceled value acquisition unit 13, the specific cylinder misfire determination unit 15, and the misfire announcing unit 19 are operated is not limited to the one shown in FIG. 4. Processing in some of the units may be collectively executed by computing an expression to acquire one value. It may not be always necessary that the misfire announcing unit 19 announces the presence of a misfire whenever the specific cylinder misfire determination unit 15 determines the presence of a misfire. For example, it may be acceptable that the specific cylinder misfire determination unit 15 stores a determination result indicating the presence of a misfire each time the specific cylinder misfire determination unit 15 determines the presence of a misfire, and the misfire announcing unit 19 announces the presence of a misfire if the determination result indicating the presence of a misfire, which is stored by the specific cylinder misfire determination unit 15, satisfies a predetermined condition.

Details of the units shown in FIG. 1 and FIG. 3 will now be described.

[Rotation Speed Acquisition Unit]

The rotation speed acquisition unit 12 acquires a rotation speed of the crankshaft 21 based on a signal supplied from the rotation sensor 105 (see FIG. 1). The rotation speed acquisition unit 12 acquires a rotation speed by measuring a time interval of signal outputs from the rotation sensor 105. The rotation speed acquisition unit 12 also acquires an angle position of the crankshaft 21 based on a signal supplied from the rotation sensor 105.

In the misfire determination device 10, a plurality of first angle positions and a plurality of second angle positions corresponding to each of a plurality of cylinders are set within one cycle. For example, the rotation speed acquisition unit 12 of this embodiment acquires the rotation speed OMG1C at the first angle position t2 corresponding to the first cylinder 20*a*. The rotation speed acquisition unit 12 also acquires the rotation speed OMG2C at the first angle position t3 corresponding to the second cylinder 20*b*.

As the rotation speed OMG at the angle position t2, for example, the rotation speed acquisition unit 12 acquires a rotation speed OMG1C corresponding to an arrangement angle ranging from the detection object part 25 associated with the angle position t2 to the adjacent detection object part 25. In this case, an instantaneous rotation speed is obtained as the rotation speed OMG1C corresponding to the first angle position t2.

Here, the rotation speed acquisition unit 12 may be configured to acquire a rotation speed in a period corresponding to detection of three or more detection object parts 25, as the rotation speed OMG1C at the angle position t2. In other words, the rotation speed acquisition unit 12 may acquire a rotation speed corresponding to a section that extends over a plurality of arrangement angles, as the rotation speed OMG1C. That is, the rotation speed acquisition unit 12 may acquire a rotation speed in a predetermined angle range including a certain angle position, as a rotation speed at the certain angle position. For example, the rotation speed acquisition unit 12 may acquire a rotation speed in a range of 360 degrees centered at the first angle position t2 corresponding to the first cylinder 20a, as a rotation speed at the first angle position t2. In this case, the rotation speed acquisition unit 12 acquires a rotation speed based on a time interval from (t1) when the detection object part 25 arranged 180 degrees before the detection object part 25 associated with the first angle position t2 is detected by the rotation sensor 105 to (t3) when the same detection object part 25 is detected after one rotation of the crankshaft 21. In this configuration, one detection object part 25 is detected twice to acquire a rotation speed.

The rotation speed acquisition unit 12 of this embodiment also acquires a rotation speed at the second angle position.

A first angle position and a second angle position corresponding to one cylinder are set at different positions. As mentioned above, a second angle position corresponding to one cylinder may be the same as a first angle position corresponding to another cylinder. For example, the second angle position corresponding to the second cylinder 20b is the same as the first angle position t2 corresponding to the first cylinder 20a. The second angle position corresponding to the first cylinder 20a is the same as the first angle position t1 corresponding to the second cylinder 20b in the previous cycle.

In this embodiment, a rotation speed at the first angle position and a rotation speed at the second angle position for each of the two cylinders can be covered by rotation speeds at two positions per one cycle.

A second angle position corresponding to a first angle position is preset in consideration of a value obtained by removing a rotation speed (second combustion fluctuation canceled value) in a section of 720 crank angle degrees centered at the second angle position from a rotation speed at the second angle position. More specifically, a second angle position is such a position that a second fluctuation manifested value obtained by removing a second combustion fluctuation canceled value from a rotation speed at the second angle position is opposite in plus/minus sign to a first fluctuation manifested value at a first angle position in a case of a misfire occurring.

For example, the fine dotted line of FIG. 3 indicates a rotation speed OMG' in a case of a misfire occurring in the second cylinder 20b. A second angle position corresponding to the second cylinder 20b is set to t2. A second fluctuation manifested value (OMG1C−NEOMG1C) obtained by removing a second combustion fluctuation canceled value NEOMG1C in a section of 720 crank angle degrees centered at the second angle position t2 from a rotation speed OMG1C at the second angle position t2 is positive. A first fluctuation manifested value (OMG2C'−NEOMG2C) at the first angle position t3 corresponding to the second cylinder 20b is negative.

In the example described above, a second angle position corresponding to one cylinder is set to the same position as a first angle position corresponding to another cylinder, but setting of the second angle position is not limited to this. For example, a second angle position corresponding to one cylinder may be different from a first angle position corresponding to another cylinder.

[Combustion Fluctuation Canceled Value Acquisition Unit]

The combustion fluctuation canceled value acquisition unit 13 acquires a rotation speed in a section of 720 crank angle degrees including a first angle position, as a first combustion fluctuation canceled value.

The combustion fluctuation canceled value acquisition unit 13 of this embodiment acquires rotation speeds NEOMG1C and NEOMG2C in sections of 720 crank angle degrees centered at a plurality of angle positions t2 and t3, respectively.

For example, the combustion fluctuation canceled value acquisition unit 13 acquires a rotation speed NEOMG2C in a section LN2C of 720 crank angle degrees centered at the first angle position t3 corresponding to the second cylinder 20b. The section LN2C of 720 crank angle degrees centered at the first angle position t3 is a section from the angle position t2 to the angle position t4. The rotation speed NEOMG2C thus acquired is a first combustion fluctuation canceled value corresponding to the second cylinder 20b.

The combustion fluctuation canceled value acquisition unit 13 also acquires a rotation speed NEOMG1C in a section LN1C of 720 crank angle degrees centered at the second angle position t2 corresponding to the second cylinder 20b. The section LN1C of 720 crank angle degrees centered at the second angle position t3 is a section from the angle position t1 to the angle position t3. The rotation speed NEOMG1C thus acquired is a second combustion fluctuation canceled value corresponding to the second cylinder 20b.

Figure 5:
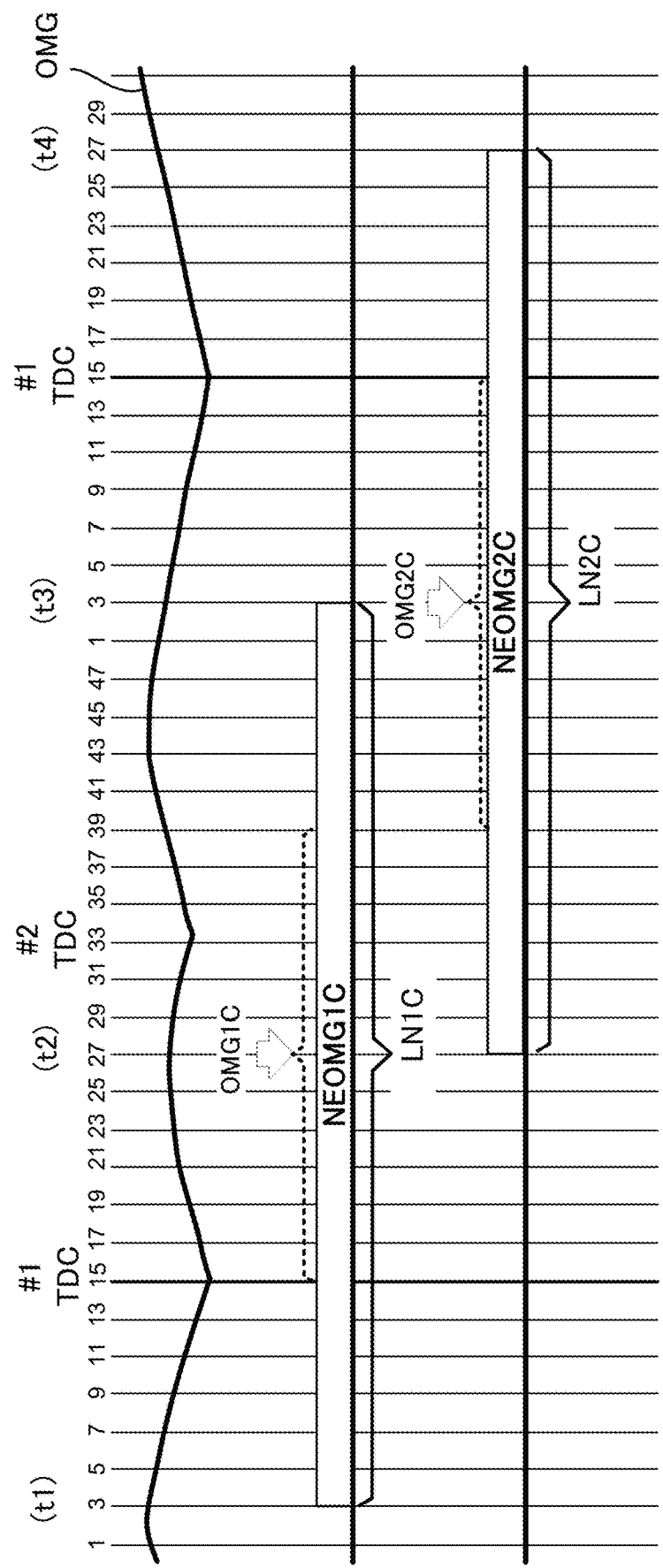
FIG. 5 is a graph enlarging a part of the rotation speed shown in FIG. 3.

FIG. 5 is a graph enlarging a part of the rotation speed shown in FIG. 3.

In FIG. 5, a part of the rotation speed OMG of FIG. 3 is shown with the horizontal axis enlarged. The horizontal axis of FIG. 5 as well as FIG. 3 represents the rotation angle of the crankshaft 21. On the horizontal axis of FIG. 5, numbers are given for identifying the detection object parts 25 provided in the crankshaft 21. The numbers shown are odd numbers. For example, the first angle position t2 corresponding to the first cylinder 20a is associated with the detection object part 25 of No. 27. The detection object parts 25 of No. 25 to No. 47 are the same as the detection object parts 25 of No. 1 to No. 23, respectively. These detection object parts 25 are assigned different numbers for distinction of rotation angle positions in one cycle, that is, in two rotations of the crankshaft 21.

FIG. 5 also shows crank angle ranges, respectively for the first combustion fluctuation canceled value NEOMG2C and the second combustion fluctuation canceled value NEOMG1C corresponding to the second cylinder 20b.

The combustion fluctuation canceled value acquisition unit 13 acquires the rotation speed NEOMG2C in the section LN2C of 720 crank angle degrees including the first angle position t3 corresponding to the second cylinder 20b. More specifically, the combustion fluctuation canceled value acquisition unit 13 acquires a rotation speed from the angle position (t2) associated with the detection object part 25 of No. 27 to the angle position (t4) associated with the detection object part 25 of No. 27 that is detected next. The acquired rotation speed is a first combustion fluctuation canceled value NEOMG2C corresponding to the second cylinder 20b. That is, the combustion fluctuation canceled value acquisition unit 13 acquires the first combustion fluctuation canceled value NEOMG2C based on a time in which the detection object part 25 of No. 27 (which is the same as No. 3) continuously passes three times.

The combustion fluctuation canceled value acquisition unit 13 also acquires the rotation speed NEOMG1C in the section LN1C of 720 crank angle degrees including the second angle position t2 corresponding to the second cylinder 20b. More specifically, the combustion fluctuation canceled value acquisition unit 13 acquires a rotation speed from the angle position (t1) associated with the detection object part 25 of No. 3 to the angle position (t3) associated with the detection object part 25 of No. 3 that is detected next. The acquired rotation speed is a second combustion fluctuation canceled value NEOMG1C corresponding to the second cylinder 20b. That is, the combustion fluctuation canceled value acquisition unit 13 acquires the second combustion fluctuation canceled value NEOMG1C based on a time in which the detection object part 25 of No. 3 (which is the same as No. 27) continuously passes three times.

Acquisition of a rotation speed by the rotation speed acquisition unit 12 will now be described with reference to FIG. 5.

As the rotation speed OMG1C at the first angle position t2 corresponding to the first cylinder 20a, the rotation speed acquisition unit 12 acquires, for example, a rotation speed NEOMG1C from the angle position associated with the detection object part 25 of No. 25 to the angle position associated with the detection object part 25 of No. 27.

It may be also possible that the rotation speed acquisition unit 12 acquires, as the rotation speed OMG1C, a rotation speed over 360 degrees from the angle position associated with the detection object part 25 of No. 15 to the angle position associated with the detection object part 25 of No. 39. The detection object part 25 of No. 15 is the same as the detection object part 25 of No. 39. In this case, therefore, the rotation speed acquisition unit 12 acquires the rotation speed OMG1C at the first angle position t2 based on a time in which the detection object part 25 of No. 15 (which is the same as No. 39) continuously passes twice.

As the rotation speed OMG2C at the first angle position t3 corresponding to the second cylinder 20b, the rotation speed acquisition unit 12 acquires, for example, a rotation speed from the angle position associated with the detection object part 25 of No. 1 to the angle position associated with the detection object part 25 of No. 3. It may be also possible that the rotation speed acquisition unit 12 acquires, as the rotation speed OMG2C, a rotation speed over 360 degrees from the angle position associated with the detection object part 25 of No. 39 to the angle position associated with the detection object part 25 of No. 15.

Referring to FIG. 3 again, the combustion fluctuation canceled value will be described.

The rotation speed NEOMG shown in FIG. 3 indicates a rotation speed at a rotation angle θ in a section of 720 crank angle degrees centered at the rotation angle θ.

As the first combustion fluctuation canceled value NEOMG2C for the first angle position t3 corresponding to the second cylinder 20b, the combustion fluctuation canceled value acquisition unit 13 acquires a rotation speed in the section LN2C of 720 crank angle degrees centered at the first angle position t3. As the second combustion fluctuation canceled value NEOMG1C for the second angle position t2 corresponding to the second cylinder 20b, the combustion fluctuation canceled value acquisition unit 13 acquires a rotation speed in the section LN1C of 720 crank angle degrees centered at the second angle position t2.

As described above, the intervals of combustion in the cylinders included in the engine 20 are not equal. Any of the cylinders included in the engine 20 completes its one-cycle operation in 720 crank angle degrees. Thus, the combustion fluctuation canceled value NEOMG is a value in which a fluctuation component attributable to combustion is canceled. The combustion fluctuation canceled value NEOMG which is a rotation speed in a section of 720 crank angle degrees is a value in which a fluctuation component attributable to unequal interval combustion is canceled. For example, a section of 720 crank angle degrees, for which the combustion fluctuation canceled value NEOMG2C is acquired, includes the first angle position (e.g., t3). Accordingly, a state of the section including the first angle position is reflected in the combustion fluctuation canceled value NEOMG.

The combustion fluctuation canceled value acquisition unit 13 of this embodiment additionally acquires a rotation speed in a section of 720 crank angle degrees, as a second combustion fluctuation canceled value for a second angle position. In this embodiment, as described above, the second angle position (t2) corresponding to one cylinder (for example, the second cylinder 20b) is the same as the first angle position (t2) corresponding to another cylinder (first cylinder 20a). Thus, when a first combustion fluctuation canceled value is acquired at a first angle position, a second combustion fluctuation canceled value at a second angle position corresponding to another cylinder is simultaneously acquired.

[Combustion Fluctuation Manifested Value Calculation Unit]

The combustion fluctuation manifested value calculation unit 14 calculates the fluctuation manifested value AOMG by removing the combustion fluctuation canceled value NEOMG from the rotation speed OMG.

The combustion fluctuation manifested value calculation unit 14 removes the first combustion fluctuation canceled value NEOMG2C acquired by the combustion fluctuation canceled value acquisition unit 13 from the rotation speed OMG2C at the first angle position t3 corresponding to the second cylinder 20b. In this manner, the combustion fluctuation manifested value calculation unit 14 calculates the first fluctuation manifested value AOMG2C.

The combustion fluctuation manifested value calculation unit 14 also removes the second combustion fluctuation canceled value NEOMG1C from the rotation speed OMG1C at the second angle position t2 corresponding to the second cylinder 20b. In this manner, the combustion fluctuation manifested value calculation unit 14 calculates the second fluctuation manifested value AOMG1C.

Removal of the combustion fluctuation canceled value NEOMG corresponding to each angle position from the rotation speed OMG at the angle position means that a fluctuation caused by an accelerator operation, acceleration, and deceleration are removed.

The combustion fluctuation canceled value acquisition unit 13 described above acquires a rotation speed in a section of 720 (720×m; m=1) crank angle degrees, so that a fluctuation caused by an accelerator operation, acceleration, and deceleration is reflected in a combustion fluctuation canceled value NEOMG with a higher accuracy. As a result, in a fluctuation manifested value AOMG calculated by removing the first combustion fluctuation canceled value NEOMG from the rotation speed OMG, an influence of fluctuation caused by the accelerator operation, acceleration, and deceleration is removed to a larger extent.

[First-Order Difference Calculation Unit]

The first-order difference calculation unit 16 calculates a difference between the first fluctuation manifested value AOMG2C and the second fluctuation manifested value AOMG1C.

For example, the first-order difference calculation unit 16 calculates the difference NDOMG2C between the first fluctuation manifested value AOMG2C (OMG2C−NEOMG2C) for the second cylinder 20b and the second fluctuation manifested value AOMG1C (OMG1C−NEOMG1C) for the second cylinder 20b.

In this embodiment, the second angle position for the second cylinder 20b is the same as the first angle position t2 for the first cylinder. The second fluctuation manifested value for the second cylinder, therefore, is the same as the first fluctuation manifested value (OMG1C−NEOMG1C) for the first cylinder.

A difference calculated by the first-order difference calculation unit 16 is a first-order difference between rotation speeds at two different positions.

In detail, the first-order difference is calculated based on the following expression:

NDOMG2C=(OMG1C−NEOMG1C)−(OMG2C−NEOMG2C), where

OMG2C represents a rotation speed at a first angle position;

NEOMG2C represents a first combustion fluctuation canceled value at the first angle position;

OMG1C represents a rotation speed at a second angle position; and

NEOMG1C represents a second combustion fluctuation canceled value at the second angle position.

To determine a misfire in the first cylinder 20a, the first-order difference calculation unit 16 calculates a first-order difference NDOMG1C between a first fluctuation manifested value for the first cylinder 20a and a second fluctuation manifested value for the first cylinder 20a.

The first-order difference for the first cylinder 20a is calculated based on the following expression:

NDOMG1C=(OMG2C−NEOMG2C)−(OMG1C−NEOMG1C).

In detail, OMG2C and NEOMG2C are values at the second angle position t1 corresponding to the first cylinder 20a.

[Specific Cylinder Misfire Determination Unit]

The specific cylinder misfire determination unit 15 determines a misfire based on a difference between a first fluctuation manifested value and a second fluctuation manifested value which is calculated by the first-order difference calculation unit 16 while the engine 20 is in operation.

The specific cylinder misfire determination unit 15 of this embodiment determines a misfire through the processing executed by the equalization processing unit 17 and the determination unit 18.

The following configurations and operations of the equalization processing unit 17 and the determination unit 18 can be considered as configurations and operations of the specific cylinder misfire determination unit 15.

The equalization processing unit 17 equalizes, for each cylinder, a first-order difference between a first fluctuation manifested value and a second fluctuation manifested value, which difference is sequentially calculated by the first-order difference calculation unit 16. For example, the first-order difference calculation unit 16 calculates one first-order difference for the first cylinder 20a per one cycle of the engine 20. The equalization processing unit 17 cumulatively equalizes the value of the first-order difference thus calculated.

As a calculation process for equalization, for example, an exponential moving average process (smoothing process) is adopted. To be specific, the equalization processing unit 17 stores the first-order difference calculated by the first-order difference calculation unit 16 in the storage unit 102 (see FIG. 2), and calculates an average value based on the first-order difference calculated by the first-order difference calculation unit 16 and the value stored in the storage unit 102 at a time of a previous determination.

The equalization process makes disturbance less influential to rotation of the crankshaft 21 for example, and enables misfires that continuously occur to be determined with a higher accuracy.

The determination unit 18 determines a misfire based on the equalization value calculated by the equalization processing unit 17. If the equalization value calculated by the equalization processing unit 17 exceeds a predetermined reference value, the determination unit 18 determines that a misfire has occurred in a corresponding cylinder. The determination unit 18 counts the number of times it is determined that a misfire has occurred. The reference value is a value prestored in the misfire determination device 10. The reference value is constituted by a map. The reference value is constituted by a map associated with, for example, a corresponding cylinder, a rotation speed, and an intake air pressure of the engine 20.

If the equalization value calculated by the equalization processing unit 17 exceeds a reference value selected in accordance with a cylinder, a rotation speed, and an intake air pressure, the determination unit 18 determines that a misfire has occurred in a corresponding cylinder.

Figure 6:
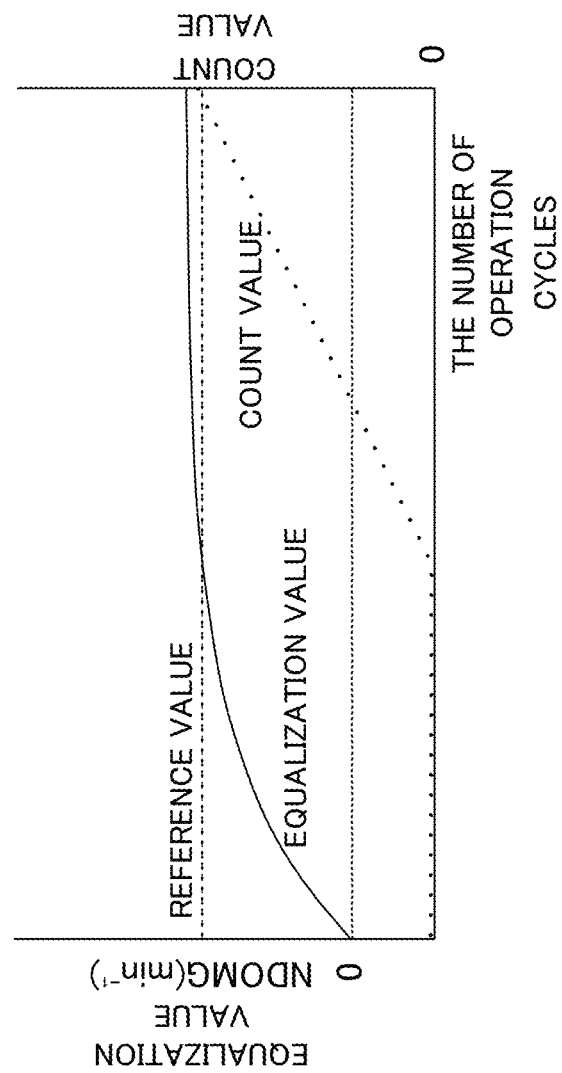
FIG. 6 is a graph illustrating an equalization value variation in a case of a misfire occurring.

FIG. 6 is a graph illustrating an equalization value variation in a case of a misfire occurring.

In FIG. 6, the horizontal axis represents the number of operation cycles of the engine 20. In the graph, the solid line indicates an equalization value NDOMG obtained through the processing executed by the equalization processing unit 17.

When continuous misfires occur in the first cylinder 20a, the equalization value NDOMG gradually increases along with the operation, due to the equalization process executed by the equalization processing unit 17.

If the equalization value NDOMG exceeds the reference value, the determination unit 18 determines that continuous misfires have occurred in a cylinder corresponding to this equalization value NDOMG The determination unit 18 counts the number of times the equalization value NDOMG exceeds the reference value. In an example shown in FIG. 6, therefore, after the equalization value NDOMG exceeds the reference value, a count value increases as the number of cycles increases. The count value roughly indicates the number of times a misfire has occurred.

In this manner, the specific cylinder misfire determination unit 15 shown in FIG. 1 determines a misfire in a specific cylinder among the plurality of cylinders included in the engine 20, based on the first-order difference between the first fluctuation manifested value AOMG2C and the second fluctuation manifested value AOMG1C, which difference is calculated by the combustion fluctuation manifested value calculation unit 14. The specific cylinder misfire determination unit 15 determines a misfire in a specific cylinder by using the first-order difference, without calculating a second-order difference based on the first-order difference.

[Misfire Announcing Unit]

The misfire announcing unit 19 announces the presence or absence of a misfire, which is determined by the specific cylinder misfire determination unit 15. If the presence of a misfire is determined by the specific cylinder misfire determination unit 15, the misfire announcing unit 19 directs the display device 30 (see FIG. 1) to display the presence of a misfire. The misfire announcing unit 19 also directs the display device 30 to display the count value counted by the determination unit 18, as the number of times a misfire has occurred.

In this embodiment, the first combustion fluctuation canceled value NEOMG2C is removed from the rotation speed OMG2C at the first angle position t3 corresponding to the second cylinder 20b, to calculate the first fluctuation manifested value AOMG2C (OMG2C−NEOMG2C). The second combustion fluctuation canceled value NEOMG1C is removed from the rotation speed OMG1C at the second angle position t2 corresponding to the second cylinder 20b, to calculate the second fluctuation manifested value AOMG1C (OMG1C−NEOMG1C).

In the first fluctuation manifested value AOMG2C, a combustion state in a section including the first angle position t3 is reflected with a high accuracy. In the first fluctuation manifested value, therefore, a fluctuation in a case of a misfire occurring in the second cylinder 20b appears more prominently.

Figure 7:
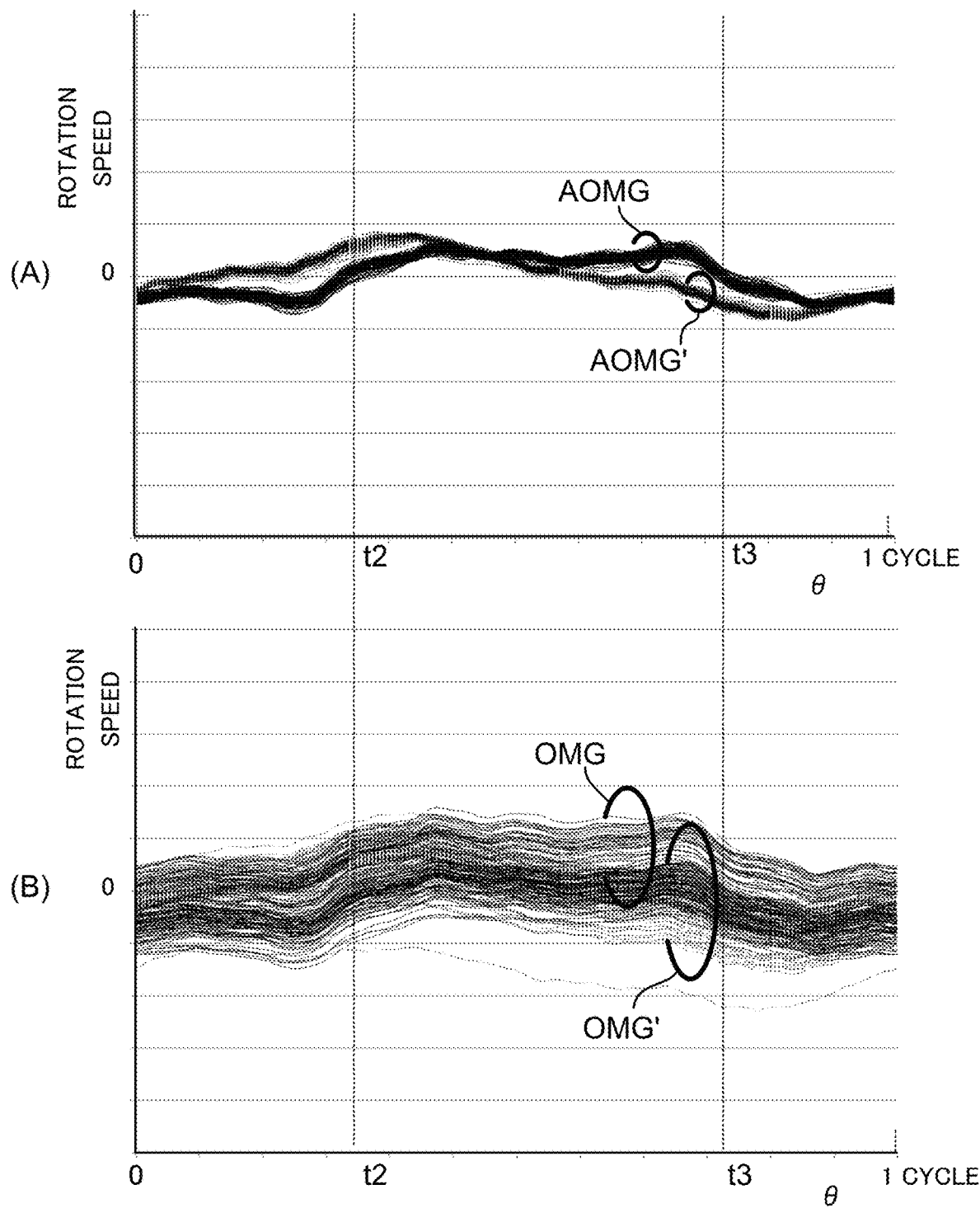
FIG. 7 depicts graphs showing rotation speed variations in a case of a misfire occurring in a second cylinder and in a case of a normal state having no misfire.

FIG. 7 contains graphs showing rotation speed variations in a case of a misfire occurring in a second cylinder and in a case of a normal state having no misfire.

The part (A) of FIG. 7 shows a rotation speed (fluctuation manifested value) AOMG after the processing is executed by the combustion fluctuation manifested value calculation unit 14. The part (B) of FIG. 7 shows a rotation speed OMG before the processing is executed by the combustion fluctuation manifested value calculation unit 14. In FIG. 7, measured values of rotation speeds in a plurality of cycle are superimposed. FIG. 7 shows a rotation speed variation over a continuous angle position range, not limited to a position where the misfire determination device 10 actually acquires a rotation speed, for the purpose of illustrating manifestation of a fluctuation caused by unequal interval combustion. In FIG. 7, for each rotation angle, a rotation speed in an angle range of 360 degrees centered at this angle is indicated as the rotation speed OMG. In the graphs, the broken line indicates a rotation speed in a case of a misfire occurring, and the solid line indicates a rotation speed in a normal state having no misfire.

As shown in the part (B) of FIG. 7, the rotation speed OMG, OMG' before the processing is executed by the combustion fluctuation manifested value calculation unit 14 exhibits a rotation speed fluctuation in a wide range.

For example, the rotation speed OMG in a normal state before the processing is executed contains a repetition of increase and decrease within one cycle, which is attributable to combustion. In a case of a misfire occurring, the rotation speed OMG' at the first angle position t3 corresponding to the second cylinder tends to be lower than in a case of the normal state. The rotation speed OMG, OMG' before the processing is executed by the combustion fluctuation manifested value calculation unit 14 exhibits a large fluctuation (variability) which exceeds a cycle period. Thus, using only the rotation speeds OMG, OMG' before the processing is executed provides a low accuracy to the misfire determination.

As shown in the part (A) of FIG. 7, the rotation speed AOMG, AOMG' obtained after the processing is executed by the combustion fluctuation manifested value calculation unit 14 has a suppressed variability for each cycle.

As a result, in the rotation speed (fluctuation manifested value) AOMG, AOMG', a fluctuation caused by unequal interval combustion is manifested more largely. Using the rotation speeds AOMG, AOMG' in which the unequal interval combustion fluctuation is manifested enables a decrease of the value at the first angle position t3 corresponding to the second cylinder to be determined with a high accuracy.

Particularly, a first-order difference between the rotation speed AOMG' at the first angle position t3 corresponding to the second cylinder 20b and the rotation speed AOMG' at the second angle position t2 corresponding to the first angle position t3, which difference is obtained in a case of a misfire occurring in the second cylinder 20b, is larger than a first-order difference in the rotation speed AOMG which is obtained when no misfire occurs.

In this manner, a misfire in the second cylinder 20b of the engine 20 can be determined with a high accuracy, based on the first-order difference in the rotation speed AOMG, AOMG' in which a fluctuation caused by unequal interval combustion is manifested by the combustion fluctuation manifested value calculation unit 14.

Figure 8:
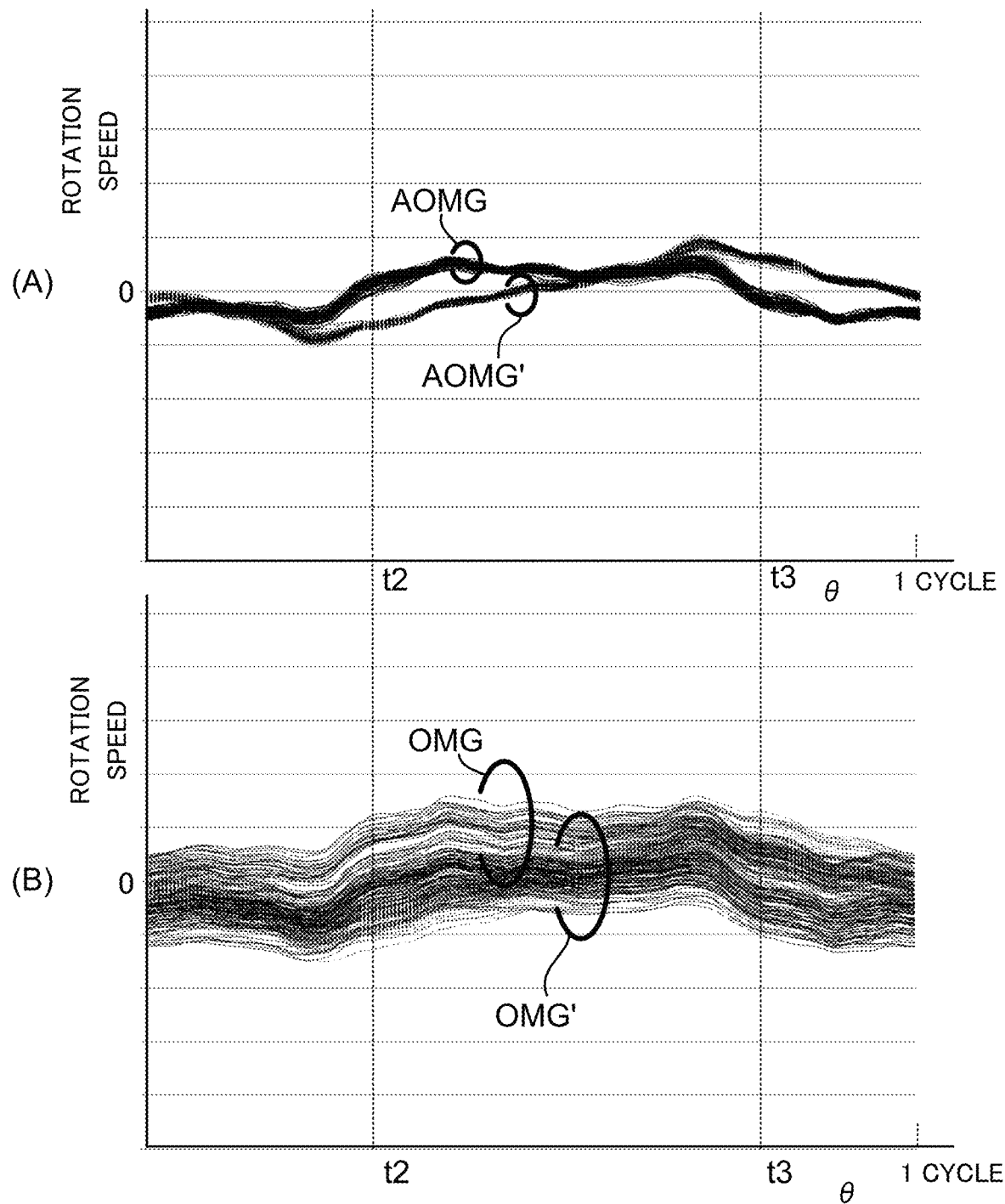
FIG. 8 depicts graphs showing rotation speed variations in a case of a misfire occurring in a first cylinder and in a case of a normal state having no misfire.

FIG. 8 contains graphs showing rotation speed variations in a case of a misfire occurring in a first cylinder and in a case of a normal state having no misfire.

The part (A) of FIG. 8 shows a rotation speed after the processing is executed by the combustion fluctuation manifested value calculation unit 14. The part (B) of FIG. 8 shows a rotation speed before the processing is executed by the combustion fluctuation manifested value calculation unit 14.

Even in a case of a misfire occurring in the first cylinder 20a, the rotation speed AOMG, AOMG' obtained after the processing is executed by the combustion fluctuation manifested value calculation unit 14 has a suppressed variability for each cycle, as shown in the part (A) of FIG. 8.

Accordingly, a misfire in the first cylinder 20a of the engine 20 can be determined with a high accuracy, based on the first-order difference in the rotation speed AOMG, AOMG' in which a fluctuation caused by unequal interval combustion is manifested by the combustion fluctuation manifested value calculation unit 14.

The description of this embodiment deals with a case where the misfire determination device 10 determines a misfire in the engine 20 which is an unequal interval combustion engine. The misfire determination device 10 of this embodiment, however, is also applicable to an equal interval combustion engine without any change. In such a case, a plurality of first angle positions corresponding to respective cylinders are set at equal intervals. A plurality of second angle positions are also set at equal intervals.

In such a configuration, the combustion fluctuation manifested value calculation unit 14 calculates a first fluctuation manifested value and a second fluctuation manifested value in which a fluctuation component caused by combustion is manifested. The first-order difference calculation unit 16 calculates a difference between the first fluctuation manifested value and the second fluctuation manifested value. The specific cylinder misfire determination unit 15 determines a misfire in a specific cylinder among a plurality of cylinders included in the engine 20, based on a first-order difference. The equalization processing unit 17 of the specific cylinder misfire determination unit 15 of this embodiment equalizes the first-order difference for each cylinder. The specific cylinder misfire determination unit 15 determines a misfire by using the first-order difference, without calculating a second-order difference based on a plurality of first-order differences. That is, the specific cylinder misfire determination unit 15 always uses a first-order difference obtained from a value at a first angle position and a value at a second angle position, to determine a misfire for a specific cylinder.

Accordingly, the misfire determination device 10 can determine a misfire in an equal interval combustion engine with a high accuracy, too.

Thus, the misfire determination device 10 is applicable to both a misfire determination in an unequal interval combustion engine and a misfire determination in an equal interval combustion engine.

Second Embodiment

A second embodiment of the present teaching will now be described.

In an engine misfire determination device of this embodiment, the specific cylinder misfire determination unit 15 does not include the equalization processing unit 17. The determination unit 18 of the specific cylinder misfire determination unit 15 determines a misfire by directly using a first-order difference calculated by the first-order difference calculation unit 16.

Except for this point, this embodiment is identical to the first embodiment. In descriptions of this embodiment, therefore, the same drawings and reference signs as mentioned in the first embodiment are used.

The determination unit 18 of the specific cylinder misfire determination unit 15 determines a misfire by using a first-order difference which is a difference between a first fluctuation manifested value AOMG2C and a second fluctuation manifested value AOMG1C.

The determination unit 18 detects a misfire based on whether or not the calculated first-order difference exceeds a predetermined reference value. The reference value is a value prestored in the misfire determination device 10. The reference value is constituted by a map. In detail, the reference value is constituted by a map associated with, for example, a corresponding cylinder, a rotation speed, and an intake air pressure of the engine 20.

If the first-order difference exceeds a reference value selected in accordance with a cylinder, a rotation speed, and an intake air pressure, the determination unit 18 determines that a misfire has occurred in the corresponding second cylinder 20b.

The misfire determination device 10 of this embodiment as well as the first embodiment can determine a misfire in an equal interval combustion engine.

Although the first and second embodiments described above illustrate misfire determinations in a two-cylinder engine, these misfire determinations are applicable to an engine including three or more cylinders, too.

In a case of a four-cylinder engine for example, a rotation speed and a combustion fluctuation canceled value are acquired at first and second angle positions that are set for each of four cylinders. Here, a second angle position for one cylinder may be the same as a first angle position for another cylinder.

[Straddled Vehicle]

FIG. 9 is a diagram showing an external appearance of a straddled vehicle equipped with the misfire determination device 10 according to the first embodiment or the second embodiment.

The straddled vehicle 50 means a type of vehicle in which a driver strides a saddle when seated.

The straddled vehicle 50 shown in FIG. 9 is a motorcycle. The straddled vehicle 50 shown in FIG. 9 includes a vehicle body 51 and a plurality of wheels 52. The vehicle body 51 supports the wheels 52. The two wheels 52 shown in FIG. 9 are provided to the vehicle body 51 of the straddled vehicle 50, and are arranged one behind the other in a front-rear direction X of the straddled vehicle 50.

The vehicle body 51 is provided with the misfire determination device 10 and the engine 20. The engine 20 drives the wheels 52. A driving force of the engine 20 is transmitted to the wheel 52 via a transmission 58 and a chain 59. The straddled vehicle 50 is not provided with a pair of left and right drive wheels, and is not provided with a differential gear which would be provided in a drive wheel of a common automobile or the like.

The misfire determination device 10 controls the engine 20. The misfire determination device 10 detects a misfire in the engine 20 based on the rotation speed of the crankshaft 21 (see FIG. 1) rotated by the engine 20.

REFERENCE SIGNS LIST

10 engine misfire determination device
12 rotation speed acquisition unit
13 combustion fluctuation canceled value acquisition unit
14 combustion fluctuation manifested value calculation unit
15 specific cylinder misfire determination unit
19 misfire announcing unit
20 engine
21 crankshaft
50 straddled vehicle

The invention claimed is:

1. An engine misfire determination device that determines a misfire in an engine including a plurality of cylinders and a crankshaft based on a crank angle signal indicating a rotation angle of the crankshaft, the engine misfire determination device comprising:

a combustion fluctuation canceled value acquisition unit that acquires a first combustion fluctuation canceled value, in which a fluctuation component attributable to combustion is canceled, and a second combustion fluctuation canceled value for every 720 crank angle degrees based on the crank angle signal while the engine is in operation, the first combustion fluctuation canceled value being a rotation speed in a section of 720×m crank angle degrees including a predetermined first angle position, the second combustion fluctuation canceled value being a value in which the fluctuation component attributable to combustion is canceled, the second combustion fluctuation canceled value being a rotation speed in a section of 720×m crank angle degrees including a second angle position that is separated from the first angle position by less than one cycle, where m is a natural number;

a combustion fluctuation manifested value calculation unit that calculates a first fluctuation manifested value, in which the fluctuation component is manifested, and a second fluctuation manifested value based on the crank angle signal while the engine is in operation, the first fluctuation manifested value being calculated by removing, from a rotation speed at the first angle position, the first combustion fluctuation canceled value acquired by the combustion fluctuation canceled value acquisition unit, the first combustion fluctuation canceled value being a rotation speed in a section of 720×m crank angle degrees including the first angle position, the second fluctuation manifested value being calculated by removing, from a rotation speed at the second angle position, the second combustion fluctuation canceled value acquired by the combustion fluctuation canceled value acquisition unit, the second combustion fluctuation canceled value being a rotation speed in a section of 720×m crank angle degrees including the second angle position;

a first-order difference calculation unit that calculates a first-order difference between the first fluctuation manifested value and the second fluctuation manifested value calculated by the combustion fluctuation manifested value calculation unit while the engine is in operation, the calculation of the first fluctuation manifested value being performed by removing a rotation speed in a section of 720×m crank angle degrees including the first angle position from a rotation speed at the first angle position, the calculation of the second fluctuation manifested value being performed by removing a rotation speed in a section of 720×m crank angle degrees including the second angle position from a rotation speed at the second angle position; and a specific cylinder misfire determination unit that determines a misfire in a specific cylinder among the plurality of cylinders included in the engine by using the first-order difference between the first fluctuation manifested value and the second fluctuation manifested value and a predetermined reference value prestored in the engine misfire determination device, without calculating a second-order difference, which is a difference between two first-order differences.

2. The engine misfire determination device according to claim 1, wherein the combustion fluctuation canceled value acquisition unit acquires, as the first combustion fluctuation canceled value, a rotation speed in a section of 720×m crank angle degrees centered at the first angle position, and acquires, as the second combustion fluctuation canceled value, a rotation speed in a section of 720×m crank angle degrees centered at the second angle position, and the combustion fluctuation manifested value calculation unit calculates the first fluctuation manifested value in which the fluctuation component is manifested by removing a rotation speed value in a section of 720×m crank angle degrees centered at the first angle position from a rotation speed at the first angle position, the rotation speed value serving as the first combustion fluctuation canceled value acquired by the combustion fluctuation canceled value acquisition unit, and calculates the second fluctuation manifested value in which the fluctuation component is manifested by removing a rotation speed value in a section of 720×m crank angle degrees centered at the second angle position from a rotation speed at the second angle position, the rotation speed value serving as the second combustion fluctuation canceled value acquired by the combustion fluctuation canceled value acquisition unit.

3. The engine misfire determination device according to claim 2, further comprising a storage unit that stores a value, wherein the first-order difference calculation unit calculates the first-order difference for every 720 crank angle degrees, and the specific cylinder misfire determination unit stores the first-order difference calculated by the first-order difference calculation unit in the storage unit, and determines a misfire in a specific cylinder among the plurality of cylinders included in the engine by using the first-order difference calculated by the first-order difference calculation unit and the value stored in the storage unit at a time of a previous determination.

4. A vehicle comprising:

the engine misfire determination device according to claim 2; and an engine for which a misfire is determined by the engine misfire determination device.

5. The engine misfire determination device according to claim 1, further comprising a storage unit that stores a value, wherein the first-order difference calculation unit calculates the first-order difference for every 720 crank angle degrees, and the specific cylinder misfire determination unit stores the first-order difference calculated by the first-order difference calculation unit in the storage unit, and determines a misfire in a specific cylinder among the plurality of cylinders included in the engine by using the first-order difference calculated by the first-order difference calculation unit and the value stored in the storage unit at a time of a previous determination.

6. A vehicle comprising:

the engine misfire determination device according to claim 5; and an engine for which a misfire is determined by the engine misfire determination device.

7. A vehicle comprising:

the engine misfire determination device according to claim 1; and an engine for which a misfire is determined by the engine misfire determination device.

* * * * *